(12) United States Patent
Amini et al.

(10) Patent No.: US 11,665,056 B2
(45) Date of Patent: May 30, 2023

(54) ADJUSTING PARAMETERS IN A NETWORK-CONNECTED SECURITY SYSTEM BASED ON CONTENT ANALYSIS

(71) Applicant: Arlo Technologies, Inc., Carlsbad, CA (US)

(72) Inventors: Peiman Amini, Cupertino, CA (US); Joseph Amalan Arul Emmanuel, Mountain View, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 132 days.

(21) Appl. No.: 17/188,841

(22) Filed: Mar. 1, 2021

(65) Prior Publication Data

US 2021/0281476 A1    Sep. 9, 2021

Related U.S. Application Data

(63) Continuation of application No. 16/239,307, filed on Jan. 3, 2019, now Pat. No. 10,938,649.

(60) Provisional application No. 62/644,847, filed on Mar. 19, 2018.

(51) Int. Cl.
| | |
|---|---|
| *H04L 41/0813* | (2022.01) |
| *H04N 7/18* | (2006.01) |
| *G08B 13/196* | (2006.01) |
| *H04L 43/08* | (2022.01) |
| *G06V 20/40* | (2022.01) |
| *G06V 20/52* | (2022.01) |

(52) U.S. Cl.
CPC ......... *H04L 41/0813* (2013.01); *G06V 20/41* (2022.01); *G06V 20/52* (2022.01); *G08B 13/19656* (2013.01); *H04L 43/08* (2013.01); *H04N 7/183* (2013.01); *G06V 20/44* (2022.01)

(58) Field of Classification Search
CPC . H04L 41/0813; H04L 43/08; H04L 41/0806; G06V 20/41; G06V 20/52; G06V 20/44; G08B 13/19656; G08B 25/10; H04N 7/183
See application file for complete search history.

(56) References Cited

U.S. PATENT DOCUMENTS

| | | | |
|---|---|---|---|
| 9,191,431 B2 | 11/2015 | Relyea et al. | |
| 11,284,012 B2 * | 3/2022 | Citerin | H04N 5/247 |
| 2004/0201677 A1 | 10/2004 | Bronson | |
| 2010/0109934 A1 | 5/2010 | Drake et al. | |
| 2013/0013698 A1 | 1/2013 | Relyea et al. | |

(Continued)

OTHER PUBLICATIONS

"Amazon Kinesis Video Streams Developer Guide", Amazon Web Services, Inc., 2018, 136 pages.

(Continued)

*Primary Examiner* — Shahbaz Nazrul
(74) *Attorney, Agent, or Firm* — Perkins Coie LLP

(57) ABSTRACT

Systems and methods are described for adjusting the parameters in a network-connected security system based on analysis of content generated by electronic devices in the network-connected security system. In an example embodiment, content such as video captured by a video surveillance camera is processed to analyze the performance of the network-connected security system. Based on the processing, updated parameters are selected to configure and improve the performance of the network-connected security system.

19 Claims, 15 Drawing Sheets

(56) References Cited

U.S. PATENT DOCUMENTS

| | | | |
|---|---|---|---|
| 2013/0053653 A1 | 2/2013 | Cuddihy et al. | |
| 2013/0128947 A1 | 5/2013 | Fryer et al. | |
| 2015/0312572 A1 | 10/2015 | Owen | |
| 2015/0379848 A1 | 12/2015 | Gallo et al. | |
| 2016/0034361 A1 | 2/2016 | Block et al. | |
| 2016/0105644 A1 | 4/2016 | Smith et al. | |
| 2016/0125714 A1 | 5/2016 | Kates et al. | |
| 2016/0284095 A1* | 9/2016 | Chalom | G06V 10/26 |
| 2016/0350596 A1* | 12/2016 | Bataller | G06T 7/80 |
| 2016/0351036 A1 | 12/2016 | Saldin et al. | |
| 2016/0379055 A1 | 12/2016 | Loui et al. | |
| 2017/0063930 A1 | 3/2017 | Chesla | |
| 2017/0124427 A1 | 5/2017 | Park et al. | |
| 2017/0126710 A1 | 5/2017 | De-levie et al. | |
| 2017/0242148 A1 | 8/2017 | Yu et al. | |
| 2018/0018508 A1* | 1/2018 | Tusch | G06V 40/20 |
| 2018/0020492 A1 | 1/2018 | Dao | |
| 2018/0121610 A1 | 5/2018 | Cayle et al. | |
| 2018/0189532 A1 | 7/2018 | Bataller et al. | |
| 2018/0197297 A1 | 7/2018 | Jia et al. | |
| 2018/0213267 A1 | 7/2018 | Khoshbin | |
| 2018/0220061 A1* | 8/2018 | Wang | H04N 5/2356 |
| 2018/0232592 A1 | 8/2018 | Stewart et al. | |
| 2018/0232895 A1 | 8/2018 | Modestine et al. | |
| 2018/0268674 A1 | 9/2018 | Siminoff | |
| 2018/0278892 A1 | 9/2018 | Zhang et al. | |
| 2018/0286201 A1 | 10/2018 | Lemberger et al. | |
| 2018/0349709 A1 | 12/2018 | Shinohara et al. | |
| 2018/0357871 A1 | 12/2018 | Siminoff | |
| 2019/0122072 A1* | 4/2019 | Cricri | G06V 10/764 |
| 2019/0221090 A1 | 7/2019 | Beiser et al. | |
| 2019/0260814 A1 | 8/2019 | Amini et al. | |
| 2019/0260987 A1 | 8/2019 | Amini et al. | |
| 2019/0261243 A1 | 8/2019 | Amini et al. | |
| 2019/0327128 A1 | 10/2019 | Harpole | |
| 2019/0327453 A1 | 10/2019 | Takagi | |
| 2021/0084382 A1 | 3/2021 | Kellicker et al. | |

OTHER PUBLICATIONS

Ananthanarayanan, Ganesh, et al., "Real-time Video Analytics—the killer app for edge computing", Microsoft Research; IEEE Computer Society, 11 pages.

Girshick, Ross, "Fast R-CNN Object detection with Caffe", Microsoft Research, 30 pages.

Hosseini, Hossein, et al., "Attacking Automatic Video Analysis Algorithms: A Case Study of Google Cloud Video Intelligence API", University of Washington, Seattle, WA, Worcester Polytechnic Institute, Worcester, MA, 12 pages.

Final Office Action dated Dec. 10, 2021 in U.S. Appl. No. 16/239,343, 33 pages.

* cited by examiner

ADJUSTING PARAMETERS IN A NETWORK-CONNECTED SECURITY SYSTEM BASED ON CONTENT ANALYSIS

CROSS-REFERENCE TO RELATED APPLICATION(S)

This application is a continuation application of U.S. patent application Ser. No. 16/239,307, titled "ADJUSTING PARAMETERS IN A NETWORK-CONNECTED SECURITY SYSTEM BASED ON CONTENT ANALYSIS," filed Jan. 3, 2019, and issuing on Mar. 2, 2021 as U.S. Pat. No. 10,938,649, which is entitled to the benefit and/or right of priority of U.S. Provisional Application No. 62/644,847, titled, "ELASTIC PROCESSING FOR VIDEO ANALYSIS AND NOTIFICATION ENHANCEMENTS," filed Mar. 19, 2018, the contents of which are hereby incorporated by reference in their entirety for all purposes. This application is therefore entitled to a priority date of Mar. 19, 2018.

TECHNICAL FIELD

Various embodiments concern computer programs and associated computer-implemented techniques for intelligently processing content generated by electronic devices such as security cameras, security lights, etc.

BACKGROUND

Surveillance is the monitoring of behavior, activities, or other changing information for the purpose of influencing, managing, or protecting people/items in a given environment. Generally, surveillance requires that the given environment be monitored by means of electronic devices such as security cameras, security lights, etc. For example, a variety of electronic devices may be distributed through the home environment to detect activities performed in/around the home.

Wireless security cameras have proved to be very popular among modern consumers due to their low installation costs and flexible installation options. Moreover, many wireless security cameras can be mounted in locations that were previously unavailable to wired security cameras. Thus, consumers can readily set up home security systems for seasonal monitoring/surveillance (e.g., of pools, yards, garages, etc.).

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
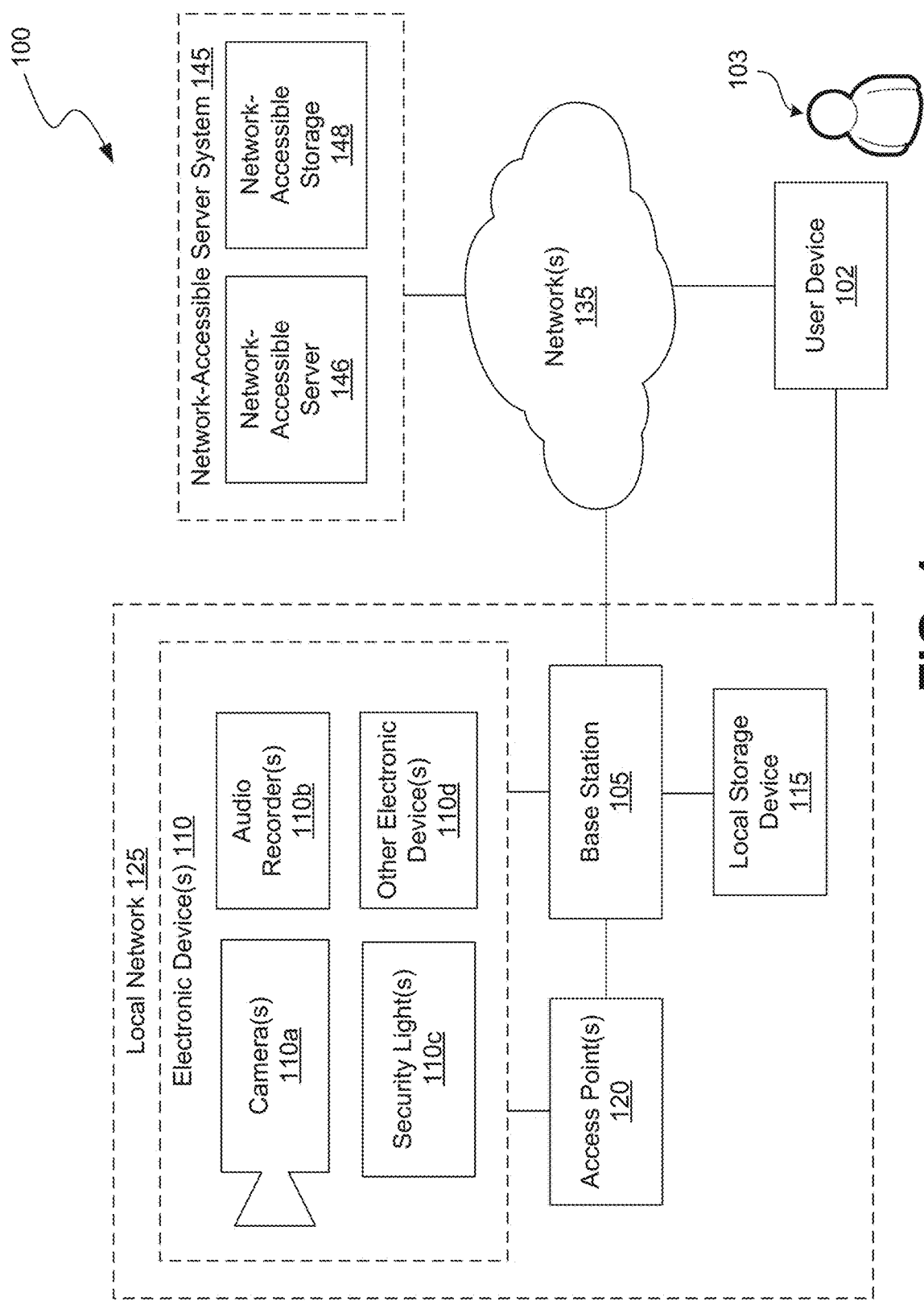
FIG. 1 is a diagram illustrating an example environment in which at least some operations described herein can be implemented.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Overview

Surveillance is the monitoring of behavior, activities, or other changing information for the purpose of influencing, managing, or protecting people/items in a given environment. Surveillance often requires that the given environment be monitored by means of various electronic devices such as security cameras, security lights, etc. In some instances, surveillance systems (also referred to as "security systems") are connected to a computer server via a network. Some content generated by a security system may be examined locally (i.e., by the security system itself), while other content generated by the security system may be examined remotely (e.g., by the computer server).

Generally, a network-connected surveillance system (also referred to as a "security system") includes a base station and one or more electronic devices. The electronic device(s) can be configured to monitor various aspects of a surveilled environment. For example, security cameras may be configured to record video upon detecting movement, while security lights may be configured to illuminate the surveilled environment upon detecting movement. Different types of electronic devices can create different types of content. Here, for example, the security cameras may generate audio data and/or video data, while the security lights may generate metadata specifying a time at which each illumination event occurred, a duration of each illumination event, etc.

The base station, meanwhile, may be responsible for transmitting the content generated by the electronic device (s) to a network-accessible computer server. Thus, each electronic device may provide data to the base station, which in turn provides at least some of the data to the network-accessible computer server.

Nowadays, security systems support features such as high-quality video recording, live video streaming, two-way audio transmission, cloud-based storage of recordings, instant alerts, etc. These features enable individuals to gain an in-depth understanding of what activities are occurring within the environment being surveilled. However, security systems having these features also experience drawbacks.

For example, each electronic device in a security system is associated with a variety of adjustable parameters that affect how frequently alerts are generated by the security system. Examples of such parameters include motion detection sensitivity, audio sensitivity, luminance gain for night vision, electronic shutter speed, etc.

Generally, these parameters are adjusted during development of a given electronic device. However, these parameters are dependent on the hardware, firmware build, and ambient environment. As such, they need to be further adjusted once deployed in a surveillance environment. While individuals may attempt to manually vary these parameters (e.g., by interacting with customer support), automating a post-deployment optimization process would result in an increase in content quality, as well as a reduction in false positives/negatives in alerts generated by the security system.

Introduced herein is a technique for analyzing content generated by a network-connected security system to adjust parameters applied by the network-connected security system that addresses the challenges discussed above. In certain some embodiments, content generated by electronic device (s) can be analyzed at a base station, a network-connected computer server, other components associated with a security system, or any combination thereof.

Electronic devices distributed throughout various surveillance environments may collect millions of files (e.g., video clips, audio clips, metadata) each day. In some embodiments, these files can be analyzed in batches. More specifically, these files can be analyzed for collecting data on how well the corresponding security systems work, so that the adjustable parameters of the electronic devices responsible for generating the files can be improved, for example, by a network-connected computer server. Results of such analysis can be rolled into parameters, software modules, etc., which may be pushed to base stations for distribution to the electronic devices or to the electronic devices directly. When battery power is a significant concern, a network-connected computer server may periodically provide updated parameters to the (powered) base station, which can then push the updated parameters to any local electronic devices with minimal energy consumption.

In some embodiments, these adjustable parameters are optimized based on the characteristics of a single surveillance environment. Said another way, these parameters may be adjusted on an individual basis. In other embodiments, these adjustable parameters are optimized based on the characteristics of multiple surveillance environments. These surveillance environments may represent all surveillance environments known to the network-connected computer server. Alternatively, these surveillance environments may be associated with a cohort that includes the administrator. The cohort can include administrators that share a characteristic in common, such as geographical location, natural lighting levels, surveillance system topology (e.g., arrangement of electronic devices), etc. Accordingly, adjustable parameters may be optimized by a network-connected computer server based on characteristics of the administrator's surveillance environment and/or characteristics of other administrators' surveillance environments.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Example Operating Environment

FIG. 1 is a block diagram illustrating an example environment in which the introduced technique can be implemented. The example environment 100 includes a network-connected security system that includes base station 105 and one or more electronic devices 110 such as cameras 110a, audio recorder devices 110b, security lights 110c, or any other types of security devices.

The base station 105 and the one or more electronic devices 110 can be connected to each other via a local network 125. The local network 125 can be a local area network (LAN). In some embodiments, the local network 125 is a WLAN, such as a home Wi-Fi, created by one or more wireless accesses points (APs) 120. In some embodiments, functionality associated with base station 105 and/or wireless AP 120 are implemented in software instantiated at a wireless networking device. In other words, the system may include multiple wireless networking devices as nodes, wherein each of the wireless networking devices is operable as a wireless AP 120 and/or base station 105. The one or more electronic devices 110 and the base station 105 can be connected to each other wirelessly, e.g., over Wi-Fi, or using wired means. The base station 105 and the one or more electronic devices 110 can be connected to each other wirelessly via the one or more wireless APs 120, or directly with each other without the wireless AP 120, e.g., using Wi-Fi direct, Wi-Fi ad hoc or similar wireless connection technologies or via wired connections. Further, the base station 105 can be connected to the local network 125 using a wired means or wirelessly.

The one or more electronic devices 110 can be battery powered or powered from a wall outlet. In some embodiments, the one or more electronic devices 110 can include one or more sensors such as motion sensors that can activate, for example, the capturing of audio or video, the encoding of captured audio or video, and/or transmission of an encoded audio or video stream when motion is detected.

Cameras 110a may capture video, encode the video as a video stream, and wirelessly transmit the video stream via local network 125 for delivery to a user device 102. In some embodiments, certain cameras may include integrated encoder components. Alternatively, or in addition, the encoder component may be a separate device coupled to the camera 110a. For example, an analog camera may be communicatively coupled to the base station 105 and/or wireless AP 120 via an analog to digital encoder device (not shown in FIG. 1). In some embodiments, the base station 105 and/or wireless APs 120 may include encoding components to encode and/or transcode video. Encoder components may include any combination of software and/or hardware configured to encode video information. Such encoders may be based on any number of different standards such as H.264, H.265, VP8, VP9, Daala, MJPEG, MPEG4, Windows Media Video (WMV), etc., for encoding video information. Accordingly, depending on the codec used, the video stream from a given camera 110a may be one of several different formats such as .AVI, .MP4, .MOV, .WMA, .MKV, etc. The video stream can include audio as well if the camera 110a includes or is communicatively coupled to an audio device 110b (e.g., a microphone). In some embodiments, cameras 110a can include infrared (IR) light emitting diode (LED) sensors, which can provide night-vision capabilities.

Similarly, audio recording devices 110b may capture audio, encode the audio as an audio stream, and wirelessly transmit the audio stream via local network 125 for delivery to a user device 102. In some embodiments, certain audio recording devices may include integrated encoder components. Alternatively, or in addition, the encoder component may be a separate device coupled to the audio recording device 110b. For example, an analog audio recording device may be communicatively coupled to the base station 105 and/or wireless AP 120 via an analog to digital encoder device (not shown in FIG. 1). In some embodiments, the base station 105 and/or wireless APs 120 may include encoding components to encode and/or transcode audio. Encoder components may include any combination of software and/or hardware configured to encode audio information. Such encoders may be based on any number of different standards such as Free Lossless Audio Codec (FLAC), MPEG-4 Audio, Windows Media Audio (WMA), etc., for encoding audio information. Accordingly, depending on the codec used, the audio stream from a given camera 110a may be one of several different formats such as .FLAC, .WMA, .AAC, etc.

Although the example environment 100 illustrates various types of electronic devices 110a-d, the security system can include just a single type of electronic device (e.g., cameras 110a) or two or more different types of electronic devices 110 which can be installed at various locations of a building. The various electronic devices 110 of the security system may include varying features and capabilities. For example, some electronic devices 110 may be battery powered while another may be powered from the wall outlet. Similarly, some electronic devices 110 may connect wirelessly to the base station 105 while others rely on wired connections. In some embodiments, electronic devices of a particular type (e.g., cameras 110a) included in the security system may also include varying features and capabilities. For example, in a given security system, a first camera 110a may include an integrated night vision, audio recording, and motion sensing capabilities while a second camera 100a only includes video capture capabilities.

The base station 105 can be a computer system that serves as a gateway to securely connect the one or more electronic devices 110 to an external network 135, for example, via one or more wireless APs 120. The external network 135 may comprise one or more networks of any type including packet switched communications networks, such as the Internet, World Wide Web portion of the Internet, extranets, intranets, and/or various other types of telecommunications networks such as cellular phone and data networks, plain old telephone system (POTS) networks, etc.

The base station 105 can provide various features such as long range wireless connectivity to the electronic devices 110, a local storage device 115, a siren, connectivity to network attached storage (NAS), and enhance battery life for certain electronic devices 110, e.g., by configuring certain electronic devices 110 for efficient operation and/or by maintaining efficient communications between the base station 105 and such electronic devices 110. The base station 105 can be configured to store the content (e.g., audio and/or video) captured by some electronic devices 110 in any of the local storage device 115 or a network-accessible storage 148. The base station 105 can be configured to generate a sound alarm from the siren when an intrusion is detected by the base station 105 based on the video streams receive from cameras 110/112.

In some embodiments, the base station 105 can create its own network within the local network 125, so that the one or more electronic devices 110 do not overload or consume the network bandwidth of the local network 125. In some embodiments, the local network 125 can include multiple access points 120 to increase wireless coverage of the base station 105, which may be beneficial or required in cases where the electronic devices 110 are wirelessly connected and are spread over a large area.

In some embodiments the local network 125 can provide wired and/or wireless coverage to user devices (e.g., user device 102), for example, via APs 120. In the example environment 100 depicted in FIG. 1, a user device 102 can connect to the base station 105, for example, via the local network 125 if located close to the base station 105 and/or wireless AP 120. Alternatively, the user device 102 can connect to the base station 105 via network 135 (e.g., the Internet). The user device 102 can be any computing device that can connect to a network and play video content, such as a smartphone, a laptop, a desktop, a tablet personal computer (PC), or a smart TV.

In an example embodiment, when a user 103 sends a request (e.g., from user device 102), to access content (e.g., audio and/or video) captured by any of the electronic devices 110, the base station 105 receives the request and in response to receiving the request, obtains the encoded stream(s) from one or more of the electronic devices 110 and transmits the encoded stream to the user device 102 for presentation. Upon receiving the encoded stream at the user device 102, a playback application in the user device 102 decodes the encoded stream and plays the audio and/or video to the user 103, for example, via speakers and/or a display of the user devices 102.

As previously mentioned, in some embodiments, the base station 105 may include an encoding/transcoding component that performs a coding process on audio and/or video received from the electronic devices 110 before streaming to the user device 102. In an example embodiment, a transcoder at the base station 105 transcodes a stream received from an electronic device 100 (e.g., a video stream from a camera 110a), for example, by decoding the encoded stream and re-encoding the stream into another format to generate a transcoded stream that it then streams to the user device 102.

The audio and/or video stream received at the user device 102 may be a real-time stream and/or a recorded stream. For example, in some embodiments, a transcoder may transcode an encoded stream received from an electronic device 110 and stream the transcoded stream to the user device 102 in real time or near real time (i.e., within several seconds) as the audio and/or video is captured at the electronic device 110. Alternatively, or in addition, audio and/or video streamed by base station 105 to the user device 102 may be retrieved from storage such as local storage 115 or a network-accessible storage 148.

The base station 105 can stream audio and/or video to the user device 102 in multiple ways. For example, the base station 105 can stream to the user device 102 using peer-to-peer (P2P) streaming technique. In P2P streaming, when the playback application on the user device 102 requests the stream, the base station 105 and the user device 102 may exchange signaling information, for example via network 135 or a network-accessible server system 145, to determine location information of the base station 105 and the user device 102, to find a best path and establish a P2P connection to route the stream from the base station 105 to the user device 102. After establishing the connection, the base station 105 streams the audio and/or video to the user device 102, eliminating the additional bandwidth cost to deliver the audio and/or video stream from the base station 105 to a network-accessible server computer 146 in a network-accessible server system 145 and for streaming from the network-accessible server computer 146 to the user device 102. In some embodiments, a network-accessible server computer 146 in the network-accessible server system 145 may keep a log of available peer node servers to route streams and establish the connection between the user device 102 and other peers. In such embodiments, instead of streaming content, the server 146 may function as a signaling server or can include signaling software whose function is to maintain and manage a list of peers and handle the signaling between the base station 105 and the user device 102. In some embodiments, the server 146 can dynamically select the best peers based on geography and network topology.

In some embodiments, the network-accessible server system 145 is a network of resources from a centralized third-party provider using Wide Area Networking (WAN) or Internet-based access technologies. In some embodiments, the network-accessible server system 145 is configured as or operates as part of a cloud network, in which the network and/or computing resources are shared across various customers or clients. Such a cloud network is distinct, independent, and different from that of the local network 125.

In some embodiments, the local network 125 may include a multi-band wireless network comprising one or more wireless networking devices (also referred to herein as nodes) that function as wireless APs 120 and/or a base station 105. For example, with respect to the example environment 100 depicted in FIG. 1, base station 105 may be implemented at a first wireless networking device that functions as a gateway and/or router. That first wireless networking device may also function as a wireless AP. Other wireless networking devices may function as satellite wireless APs that are wirelessly connected to each other via a backhaul link. The multiple wireless networking devices provide wireless network connections (e.g., using Wi-Fi) to one or more wireless client devices such as one or more wireless electronic devices 110 or any other devices such as desktop computers, laptop computers, tablet computers, mobile phones, wearable smart devices, game consoles, smart home devices, etc. The wireless networking devices together provide a single wireless network (e.g., network 125) configured to provide broad coverage to the client devices. The system of wireless networking devices can dynamically optimize the wireless connections of the client devices without the need of reconnecting. An example of the multi-band wireless networking system is the NETGEAR® Orbi® system. Such systems are exemplified in U.S. patent application Ser. No. 15/287,711, filed Oct. 6, 2016, and Ser. No. 15/271,912, filed Sep. 21, 2016, now issued as U.S. Pat. No. 9,967,884 both of which are hereby incorporated by reference in their entireties for all purposes.

The wireless networking devices of a multi-band wireless networking system can include radio components for multiple wireless bands, such as 2.5 GHz frequency band, low 5 GHz frequency band, and high 5 GHz frequency band. In some embodiments, at least one of the bands can be dedicated to the wireless communications among the wireless networking devices of the system. Such wireless communications among the wireless networking devices of the system are referred to herein as "backhaul" communications. Any other bands can be used for wireless communications between the wireless networking devices of the system and client devices such as cameras 110 connecting to the system. The wireless communications between the wireless networking devices of the system and client devices are referred to as "fronthaul" communications.

Figure 2:
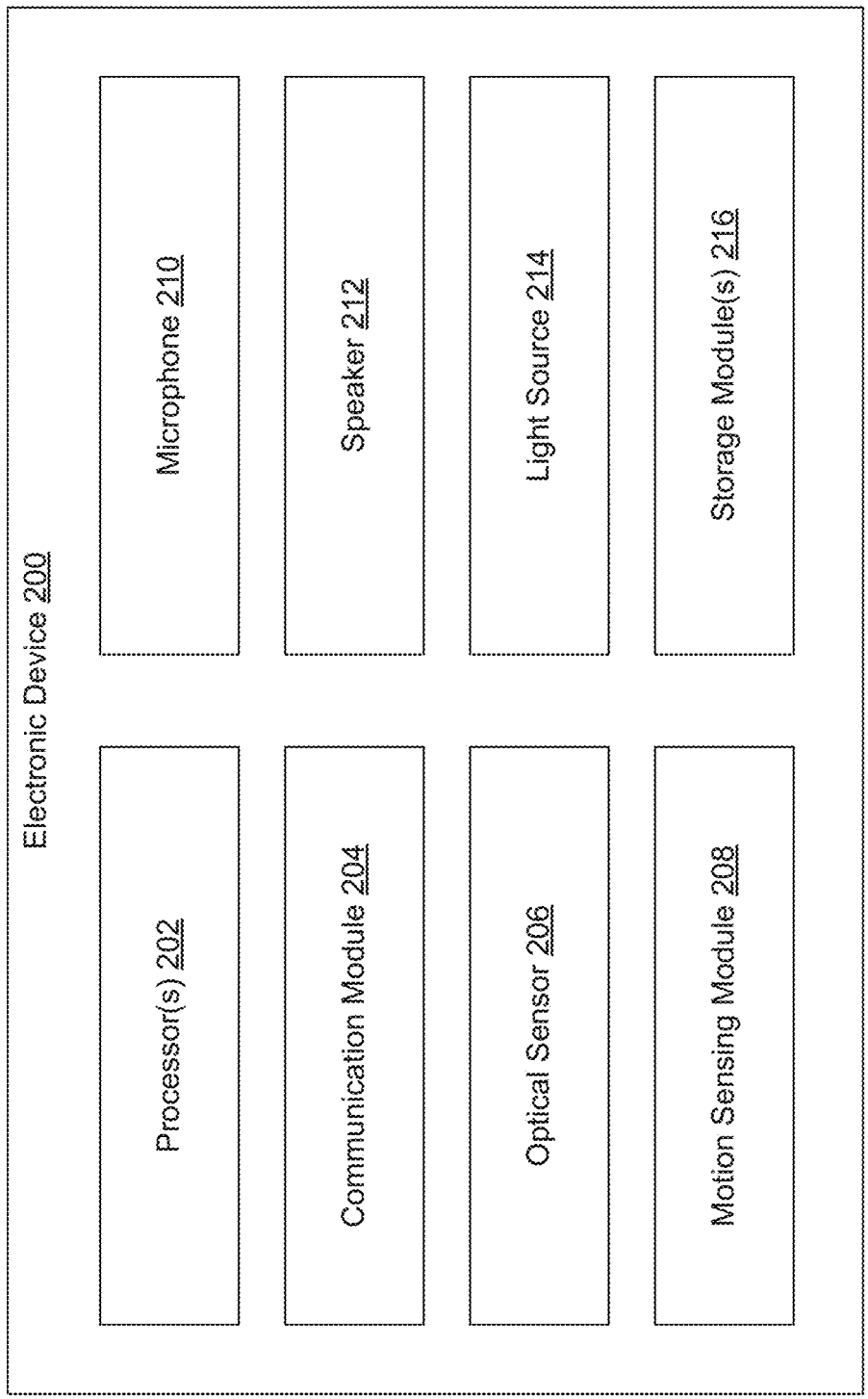
FIG. 2 is a diagram illustrating various functional components of an example electronic device configured to monitor various aspects of a surveilled environment.

FIG. 2 shows a high-level functional block diagram illustrating the architecture of an example electronic device 200 (e.g., similar to electronic devices 110 described with respect to FIG. 1) that monitors various aspects of a surveilled environment. As further described below, the electronic device 200 may generate content while monitoring the surveilled environment, and then transmit the content to a base station for further processing.

The electronic device 200 (also referred to as a "recording device") can include one or more processors 202, a communication module 204, an optical sensor 206, a motion sensing module 208, a microphone 210, a speaker 212, a light source 214, and one or more storage modules 216.

The processor(s) 202 can execute instructions stored in the storage module(s) 216, which can be any device or mechanism capable of storing information. In some embodiments, a single storage module includes multiple computer programs for performing different operations (e.g., image recognition, noise reduction, filtering), while in other embodiments each computer program is hosted within a separate storage module.

The communication module 204 can manage communication between various components of the electronic device 200. The communication module 204 can also manage communications between the electronic device 200 and a base station, another electronic device, etc. For example, the communication module 204 may facilitate communication with a mobile phone, tablet computer, wireless access point (WAP), etc. As another example, the communication module 204 may facilitate communication with a base station responsible for communicating with a network-connected computer server; more specifically, the communication module 204 may be configured to transmit content generated by the electronic device 200 to the base station for processing. As further described below, the base station may examine the content itself or transmit the content to the network-connected computer server for examination.

The optical sensor 206 (also referred to as "image sensors") can be configured to generate optical data related to the surveilled environment. Examples of optical sensors include charged-coupled devices (CCDs), complementary metal-oxide-semiconductors (CMOS s), infrared detectors, etc. In some embodiments, the optical sensor 206 is configured to generate a video recording of the surveilled environment responsive to, for example, determining that movement has been detected within the surveilled environment. In other embodiments, the optical data generated by the optical sensor 206 is used by the motion sensing module 208 to determine whether movement has occurred. The motion sensing module 208 may also consider data generated by other components (e.g., the microphone) as input. Thus, an electronic device 200 may include multiple optical sensors of different types (e.g., visible light sensors and/or IR sensors for night vision).

The microphone 210 can be configured to record sounds within the surveilled environment. The electronic device 200 may include multiple microphones. In such embodiments, the microphones may be omnidirectional microphones designed to pick up sound from all directions. Alternatively, the microphones may be directional microphones designed to pick up sounds coming from a specific direction. For example, if the electronic device 200 is intended to be mounted in a certain orientation (e.g., such that the camera 208 is facing a doorway), then the electronic device 200 may include at least one microphone arranged to pick up sounds originating from near the point of focus.

The speaker 212, meanwhile, can be configured to convert an electrical audio signal into a corresponding sound that is projected into the surveilled environment. Together with the microphone 210, the speaker 212 enables an individual located within the surveilled environment to converse with another individual located outside of the surveilled environment. For example, the other individual may be a homeowner who has a computer program (e.g., a mobile application) installed on her mobile phone for monitoring the surveilled environment.

The light source 214 can be configured to illuminate the surveilled environment. For example, the light source 214 may illuminate the surveilled environment responsive to a determination that movement has been detected within the surveilled environment. The light source 214 may generate metadata specifying a time at which each illumination event occurred, a duration of each illumination event, etc. This metadata can be examined by the processor(s) 202 and/or transmitted by the communication module 204 to the base station for further processing.

As previously discussed with respect to FIG. 1, electronic devices 110 may be configured as different types of devices such as cameras 110a, audio recording devices 110b, security lights 110c, and other types of devices. Accordingly, embodiments of the electronic device 200 may include some or all of these components, as well as other components not shown here. For example, if the electronic device 200 is a security camera 110a, then some components (e.g., the microphone 210, speaker 212, and/or light source 214) may not be included. As another example, if the electronic device 200 is a security light 110c, then other components (e.g., the camera 208, microphone 210, and/or speaker 212) may not be included.

Figure 3:
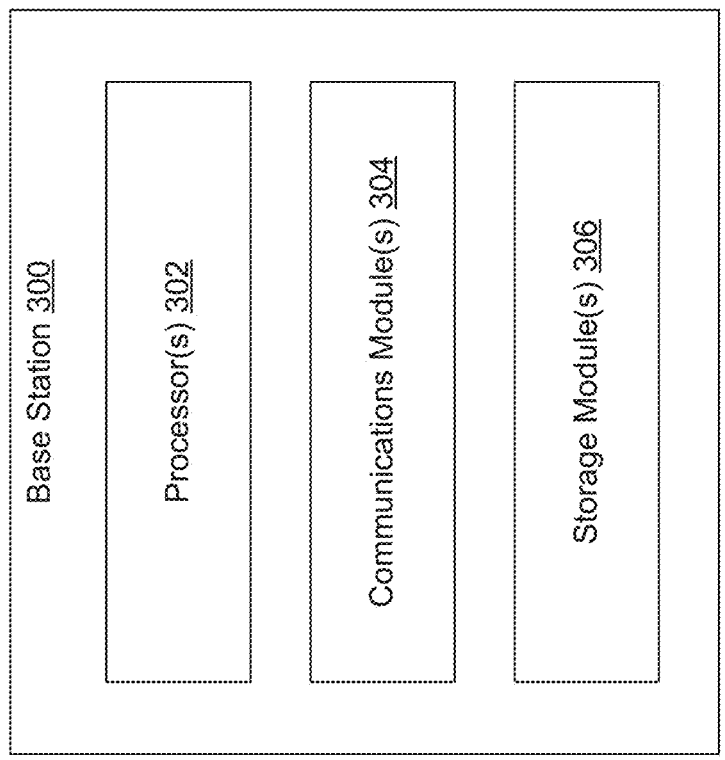
FIG. 3 is a diagram illustrating various functional components of an example base station associated with a network-connected security system configured to monitor various aspects of a surveilled environment.

FIG. 3 is a high-level functional block diagram illustrating an example base station 300 configured to process content generated by electronic devices (e.g., electronic device 200 of FIG. 2) and forward the content to other computing devices such as a network-connected computer server, etc.

The base station 300 can include one or more processors 302, a communication module 304, and one or more storage modules 306. In some embodiments, a single storage module includes multiple computer programs for performing different operations (e.g., image recognition, noise reduction, filtering), while in other embodiments each computer program is hosted within a separate storage module. Moreover, the base station 300 may include a separate storage module for each electronic device within its corresponding surveillance environment, each type of electronic device within its corresponding surveillance environment, etc.

Such a categorization enables the base station 300 to readily identify the content/data generated by security cameras, security lights, etc. The content/data generated by each type of electronic device may be treated differently by the base station 300. For example, the base station 300 may locally process sensitive content/data but transmit less sensitive content/data for processing by a network-connected computer server.

Thus, in some embodiments, the base station 300 processes content/data generated by the electronic devices, for example, to analyze the content to understand what events are occurring within the surveilled environment, while in other embodiments the base station 300 transmits the content/data to a network-connected computer server responsible for performing such analysis.

The communication module 304 can manage communication with electronic device(s) within the surveilled environment and/or the network-connected computer server. In some embodiments, different communication modules handle these communications. For example, the base station 300 may include one communication module for communicating with the electronic device(s) via a short-range communication protocol, such as Bluetooth® or Near Field Communication, and another communication module for communicating with the network-connected computer server via a cellular network or the Internet.

Figure 4:
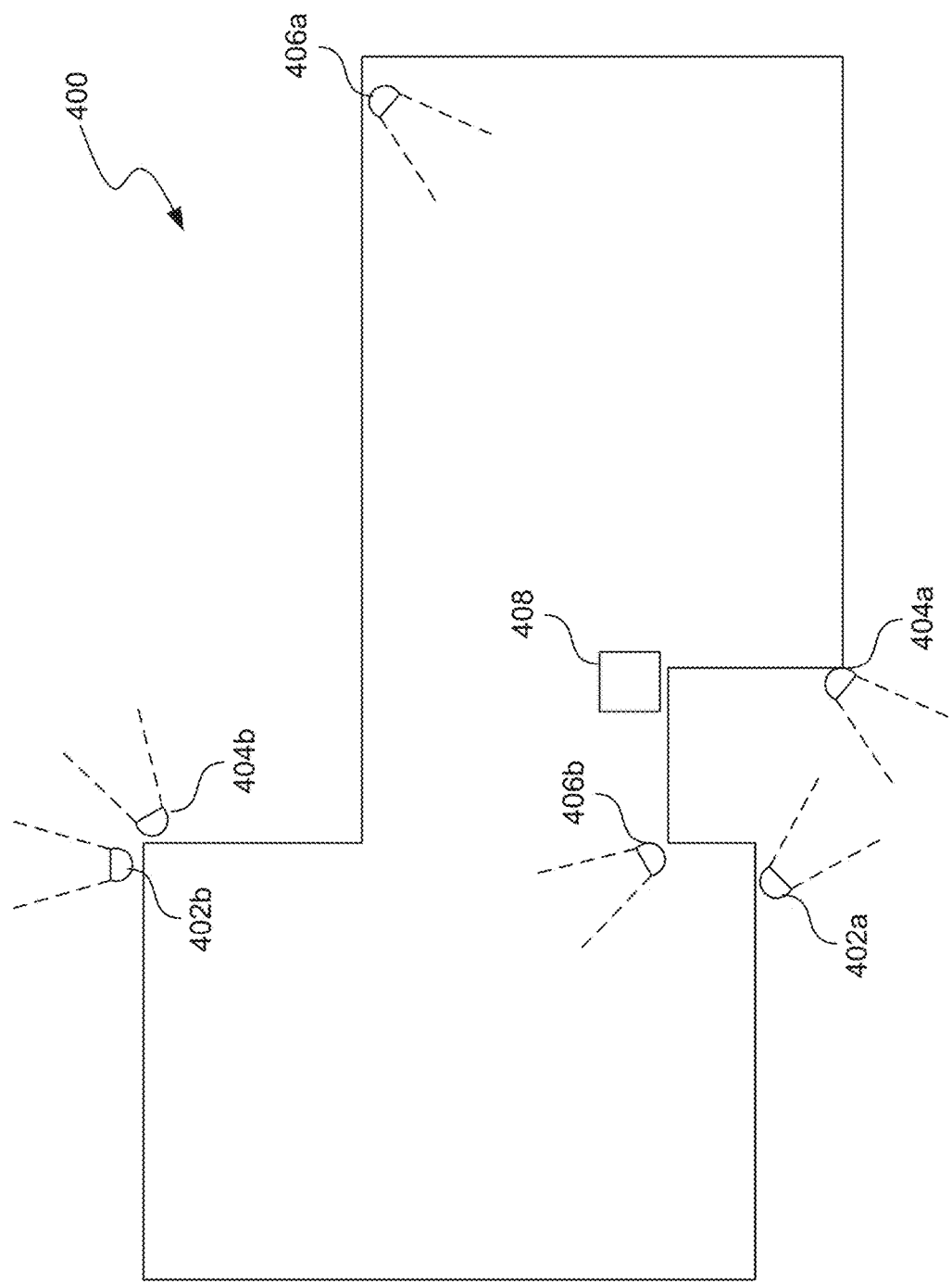
FIG. 4 is a plan view of a surveilled environment (e.g., a home) illustrating an example arrangement of devices associated with a network-connected security system.

FIG. 4 depicts a network security system that includes a variety of electronic devices configured to collectively monitor a surveilled environment 400 (e.g., the interior and exterior of a home). Here, the variety of electronic devices includes multiple security lights 402a-b, multiple external security cameras 404a-b, and multiple internal security cameras 406a-b. However, those skilled in the art will recognize that the network security system could include any number of security lights, security cameras, and other types of electronic devices. Some or all of these electronic devices are communicatively coupled to a base station 408 that can be located in or near the surveilled environment 400. Each electronic device can be connected to the base station 408 via a wired communication channel or a wireless communication channel.

Figure 5A:
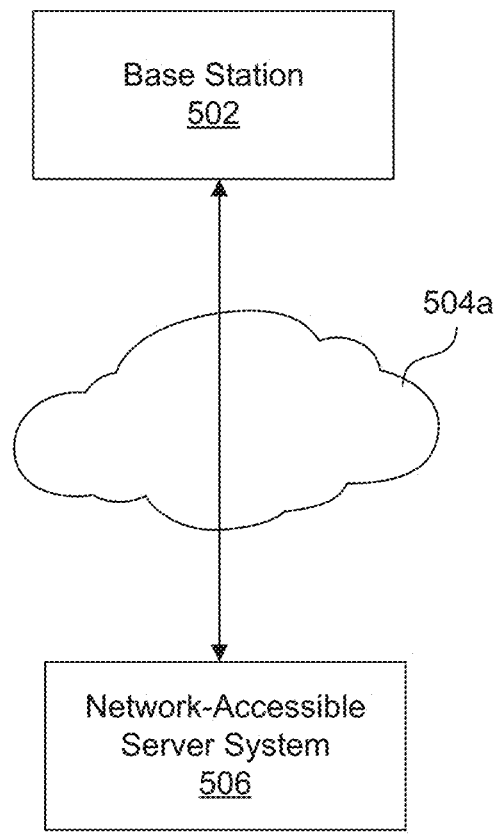
FIG. 5A is a diagram illustrating a network environment that includes a base station designed to receive content generated by one or more electronic devices arranged throughout a surveilled environment.

FIG. 5A illustrates an example network environment 500a that includes a base station 502 designed to receive content generated by one or more electronic devices arranged throughout a surveilled environment. The base station 502 can transmit at least some of the content to a network-accessible server system 506. The network-accessible server system 506 may supplement the content based on information inferred from content uploaded by other base stations corresponding to other surveilled environments.

The base station 502 and the network-accessible server system 506 can be connected to one another via a computer network 504a. The computer network 504a may include a personal area network (PAN), local area network (LAN), wide area network (WAN), metropolitan area network (MAN), cellular network, the Internet, or any combination thereof.

Figure 5B:
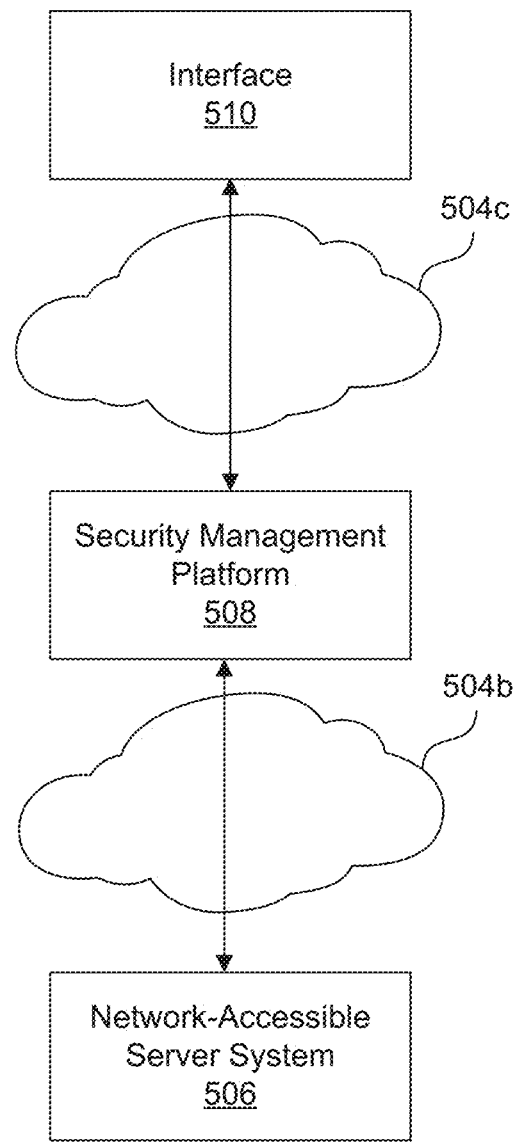
FIG. 5B is a diagram illustrating a network environment that includes a security management platform that is supported by the network-accessible server system.

FIG. 5B illustrates an example network environment 500b that includes a security management platform 508 that is supported by the network-accessible server system 506. Users can interface with the security management platform 508 via an interface 510. For example, a homeowner may examine content generated by electronic devices arranged proximate her home via the interface 510.

The security management platform 508 may be responsible for parsing content/data generated by electronic device(s) arranged throughout a surveilled environment to detect occurrences of events within the surveilled environment. The security management platform 508 may also be responsible for creating interfaces through which an individual can view content (e.g., video clips and audio clips), initiate an interaction within someone located in the surveilled environment, manage preferences, etc.

As noted above, the security management platform 508 may reside in a network environment 500b. Thus, the security management platform 508 may be connected to one or more networks 504b-c. Similar to network 504a, networks 504b-c can include PANs, LANs, WANs, MANs, cellular networks, the Internet, etc. Additionally, or alternatively, the security management platform 508 can be communicatively coupled to computing device(s) over a short-range communication protocol, such as Bluetooth® or NFC.

The interface 510 is preferably accessible via a web browser, desktop application, mobile application, or over-the-top (OTT) application. Accordingly, the interface 510 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Electronic Device Parameters

As previously discussed, each electronic device in a security system may be associated with a variety of adjustable parameters that impact the effective operation of the security system. The types of parameters available to be adjusted will depend on the type of electronic device.

Adjustable parameters for video cameras 110a and/or audio recording devices 110b may include, for example, encoder parameters that impact how captured audio and/or video is encoded and/or transcoded. Encoder parameters include, for example, encoder profile, encoding standard (e.g., H.264, H.265, VP8, VP9, Daala, MJPEG, MPEG4, WMV, etc., for video), a codec based on any of the aforementioned standards, output format (e.g., .AVI, .MP4, .MOV, .WMA, .MKV, etc., for video), output resolution (for video), output bitrate (e.g., target bitrate, max bit rate, etc.), speed control parameters to manage quality vs. speed during the encoding process, quantization parameter (QP), frame rate (for video), group-of-pictures size (GOP) (for video), encoding techniques or algorithms to apply (e.g., context-based adaptive variable-length coding (CAVLC), context-based adaptive binary arithmetic coding (CABAC), etc.), rate control parameters (e.g., variable bitrate (VBR), constant bitrate (CBR), constant rate factor (CRF), constant quantization parameter (constant QP), etc.), one pass vs. multi-pass encoding, and any other such parameters that define how a piece of audio and/or video information is to be encoded.

A quantization parameter is indicative of compression of an encoded video stream. In some embodiments, the higher the quantization parameter the higher the compression of the encoded video stream and lower the file size of the encoded video stream.

A frame rate is a number of frames that appear every second, which is typically measured in frames per second (fps). In some embodiments, the higher the frame rate, the more frames per second are used to display the sequence of images, resulting in smoother motion. The trade-off for higher quality, however, is that higher frame rates require a larger amount of data, which uses more bandwidth.

A GOP size is a number of frames between two consecutive key frames. In some video encoding types, such as MPEG-4 and H.264, the video stream consists of I-frames (key frames), P-frames, and B-frames (collectively referred as "delta frames"). An I-frame or the key frame is a self-containing frame or complete video frame that does not need references to other frames. Each P-frame and B-frame uses references to previous I- or P-frames, and will contain only information about the content that is different compared to previous frames. The GOP stands for the number of frames between two I-frames. By increasing the length of GOP, there will be less I-frames per a certain amount of time. Since key frames are much bigger than delta frames by size, longer gaps between key frames can optimize the bandwidth consumption and storage space consumption. In some embodiments, the lower the GOP size the higher the bit rate and higher the file size of an encoded video stream.

A resolution of a video feed is indicative of a number of pixels used for recording the video feed. In some embodiments, the higher the resolution the higher the quality of the encoded video stream, the greater the file size of the encoded video stream and greater the network bandwidth consumed in transmission of the encoded video stream. For example, a High-Definition (HD) or 720p resolution uses 1280×720 pixels, a full HD or 1080p resolution uses 1920×1080, and a 4K resolution uses 3840×2160 pixels.

Adjustable parameters for video cameras 110a may also include optical parameters such as focal length, aperture, sensitivity (e.g., ISO), shutter speed, exposure, and/or image processing parameters such as white balance, image noise level, etc., that impact the capture of images and video.

Focal length refers to the distance between the center of a lens (or system of lenses and mirrors) and its focus. Longer focal length leads to higher magnification and a narrower angle of view; conversely, shorter focal length is associated with lower magnification and a wider angle of view. The focal length can be adjusted, for example, by moving an optical sensor relative to the lens (e.g., as in certain video camera systems, equipped with zoom lenses).

Aperture refers the space through which incident light passes in a video camera. The aperture can be adjusted in certain video camera systems equipped with a variable aperture mechanism.

Sensitivity refers to a measure of the optical sensors' sensitivity to light in a digital video camera. Sensitivity is sometimes set based on an ISO value. The lower the ISO value, the less sensitive the sensor is to light. High ISO values, on the other hand, increase the sensitivity of the optical sensor enabling the capture of quality images even in low light conditions. An ISO for a video camera can be adjusted, for example, by adjusting amplification when converting the light detected by the optical sensor to an analog electrical signal or digital signal.

Exposure refers to the amount of light per unit of area reaching the optical sensor. In some cases, exposure for a given image can be measured as a cumulative function of intensity values across the image. In some embodiments, adjusting an exposure parameter may include adjusting parameters for any of shutter speed, aperture, and sensitivity.

White balance (or more generally color balance) refers to the neutralization of the color of an illuminant present when capturing an image. When capturing an image, the dominant light source (e.g., the sun during the day) produces a color that affects the appearance of scene objects captured in the image. The color cast by the dominant light source affects the color normally associated with white by a human viewing the image. Adjusting white balance can include, for example, identifying a color of the illuminant (i.e., the dominant light source) and adjusting the color levels (e.g., by adjusting image processing parameters) to neutralize the identified color of the illuminant. Identifying the color of the illuminant in captured images may include, for example, identifying the brightest pixel (or pixels) in the image and determining the color of those pixels since highlights tend to have the color of the illuminant.

Adjustable parameters for other types of electronic devices may include, for example, sensitivity/thresholds (during the day and night) for motion detection devices, light-emitting diode (LED) lux for security lights, etc.

The aforementioned electronic device parameters associated with a security system are just examples provided for illustrative purposes. A person having ordinary skill in the art will recognize that other parameters may similarly be adjusted and optimized using the introduced technique.

Adjusting Electronic Device Parameters Based on Analysis of Content

Figure 6:
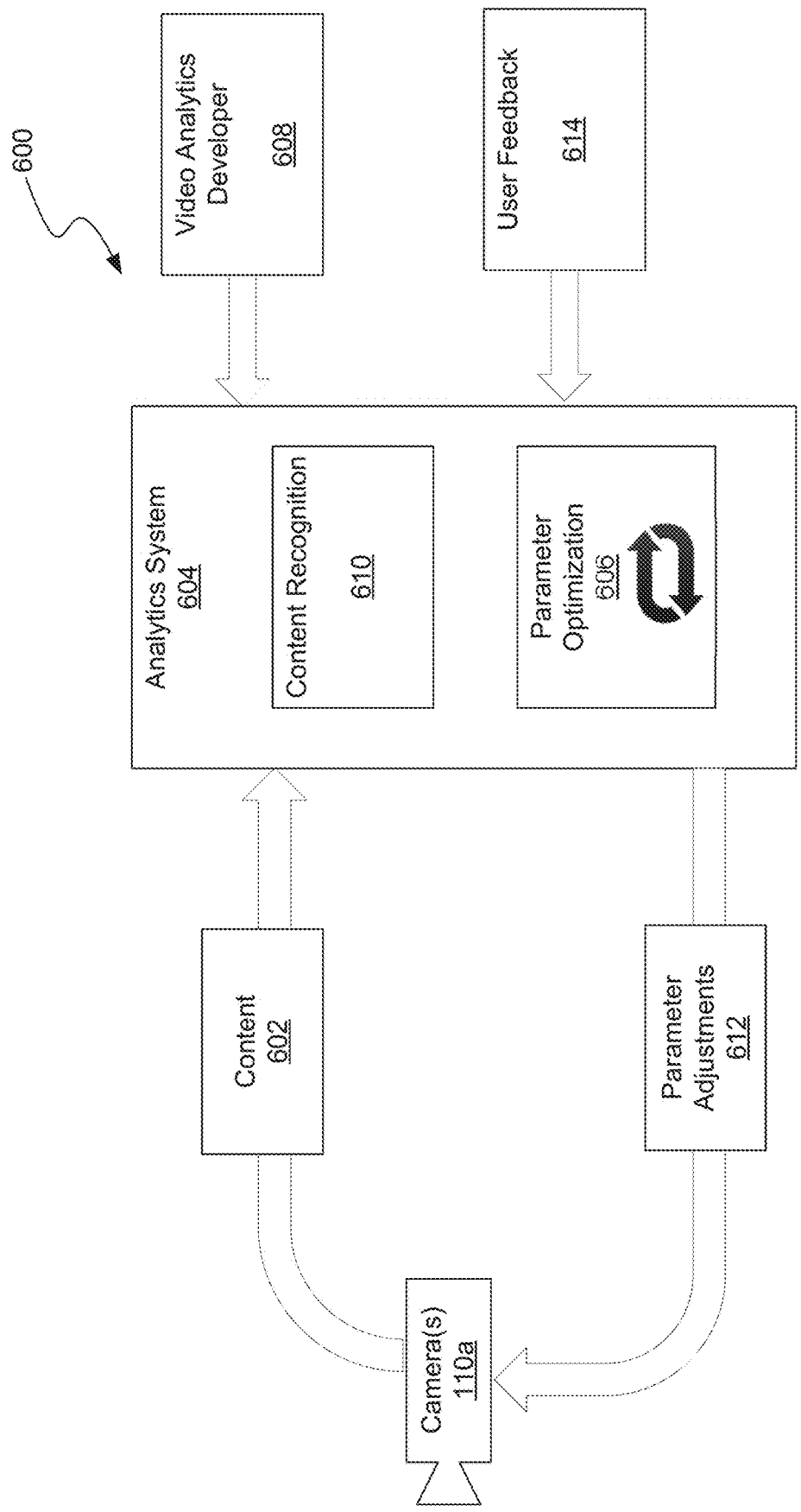
FIG. 6 is an architecture flow diagram illustrating an environment including an analytics system for adjusting parameters in a network-connected security system based on analysis of content generated at electronic devices in the network-connected security system.

FIG. 6 shows a flow diagram illustrating an example process 600 for adjusting one or more parameters associated with electronic devices in a network-connected security system. Some or all of the steps described with respect to FIG. 6 may be executed at least in part by an analytics system 604 deployed on a base station 105, at a network-accessible server system 145, at one or more electronic devices 110, or any combination thereof. In other words, the analytics system 604 depicted in FIG. 6 refers to a functional entity that may include hardware and/or software elements at any one or more of the components depicted in the example operation environment 100 depicted in FIG. 1.

Further, while the embodiment is described in the context of a security camera, those skilled in the art will recognize that similar techniques could also be employed with other types of electronic devices.

Initially, one or more security cameras 110a generate content 602, for example, by capturing video and encoding the captured video into digital information. The content 602 may include, for example, one or more digital files including the encoded video.

The content 602 is then fed into an analytics system 604 for processing according to the introduced technique. In some embodiments, the step of feeding the content 602 into the analytics system 604 may include a camera 110a transmitting the generated content 602 over a computer network (e.g., a wired or wireless local network 125) to a base station 105. The base station 105 may then forward the received content 602 to a network-accessible server system 145 that implements the analytics system 604. Alternatively, or in addition, the camera 110a and/or base station 105 may include processing components that implement at least a portion of the analytics system 604.

In some embodiments, content 602 is fed into the analytics system 604 continually as it is generated. For example, in some embodiments, the camera 110a may generate a digital video continuous stream that is transmitted to the analytics system 604 for storage and processing by way of the base station 105.

Alternatively, the camera 110a may be configured to generate content 602 at periodic intervals and/or in response to detecting certain conditions or events. For example, the camera 110a may be equipped with, or in communication with, a motion detector that triggers the capturing and encoding of video when motion in the surveilled environment is detected. In response to receiving an indication of detected motion, the camera 110a may begin generating content 602 by capturing video and encoding the captured video. As another illustrative example, instead of transmitting a continuous stream of content 602, the video camera 110a may transmit small portions of content (e.g., short video clips or still images) at period intervals (e.g., every few seconds).

In some embodiments, content 602 is fed into the analytics system 604 periodically (e.g., daily, weekly, or monthly) or in response to detected events. For example, even if the content 602 is continually generated, such content 602 may be held in storage (e.g., at local storage 115 or a NAS 148) before being released (periodically or in response to detected events) for analysis by the analytics system 604.

Thereafter, a parameter optimization routine 606 is initiated at the analytics system 604 to process the content 602 and select values for one or more parameters based on the analysis. In some embodiments, a video analytics developer 608 may initiate the parameter optimization routine 606 at the analytics system 604. Alternatively, or in addition, the analytics system 604 may initiate automatically the parameter optimization routine 606, for example, in response to detecting a certain condition (e.g., receiving a certain number of video clips, determining a certain amount of time has elapsed since the most recent execution of the parameter optimization routine, etc.).

In some embodiments, processing of content 602 may include a content recognition process 610 to gain some level of understanding of the information captured in the content 602. For example, the content recognition process 610 may be applied to classify the received content into general categories such as "good quality" or "bad quality" based on some specified objective and/or subjective criteria. For example, the analytics system 604 may be configured to classify content 602 (e.g., video) that exhibits contrast levels below a specified threshold as "low quality" which can inform the parameter optimization routine 606 how to adjust certain parameters to increase the contrast levels above the specified threshold. Such a process may similarly be applied to classify received audio clips as of "good quality" or "bad quality."

Figure 7:
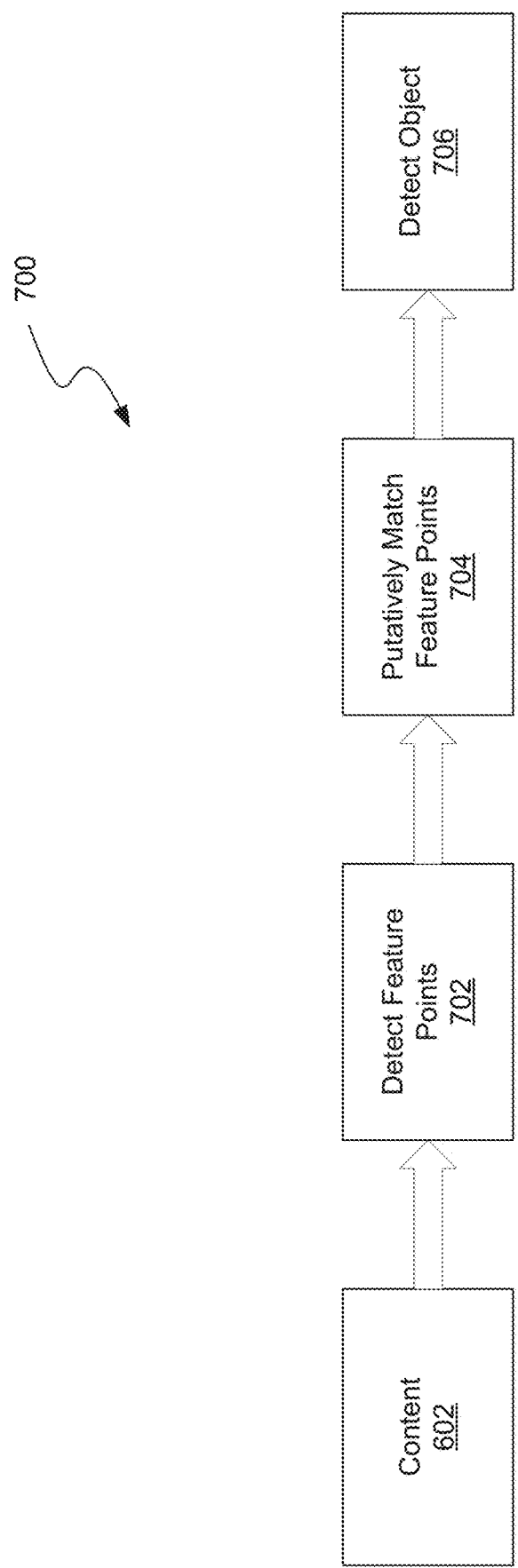
FIG. 7 is a flow diagram illustrating an example process for detecting objects in captured image or video content.

In some embodiments, the content recognition process 610 may apply computer vision techniques to detect physical objects captured in the content 602. FIG. 7 shows a flow diagram that illustrates an example high-level process 700 for image processing-based object detection that involves, for example, processing content 602 to detect identifiable feature points (step 702), identifying putative point matches (step 704), and detecting an object based on the putative point matches (step 706).

The content recognition process 610 may further classify such detected objects. For example, given one or more classes of objects (e.g., humans, buildings, cars, animals, etc.), the content recognition process 610 may process the video content 602 to identify instances of various classes of physical objects occurring in the captured video of the surveilled environment.

In some embodiments, the content recognition process 610 may employ deep learning-based video recognition to classify detected objects. In an example deep learning-based video recognition process for detecting a face, raw image data is input as a matrix of pixels. A first representational layer may abstract the pixels and encode edges. A second layer may compose and encode arrangements of edges, for example, to detect objects. A third layer may encode identifiable features such as a nose and eyes. A fourth layer may recognize that the image includes a face based on the arrangement of identifiable features.

Figure 8:
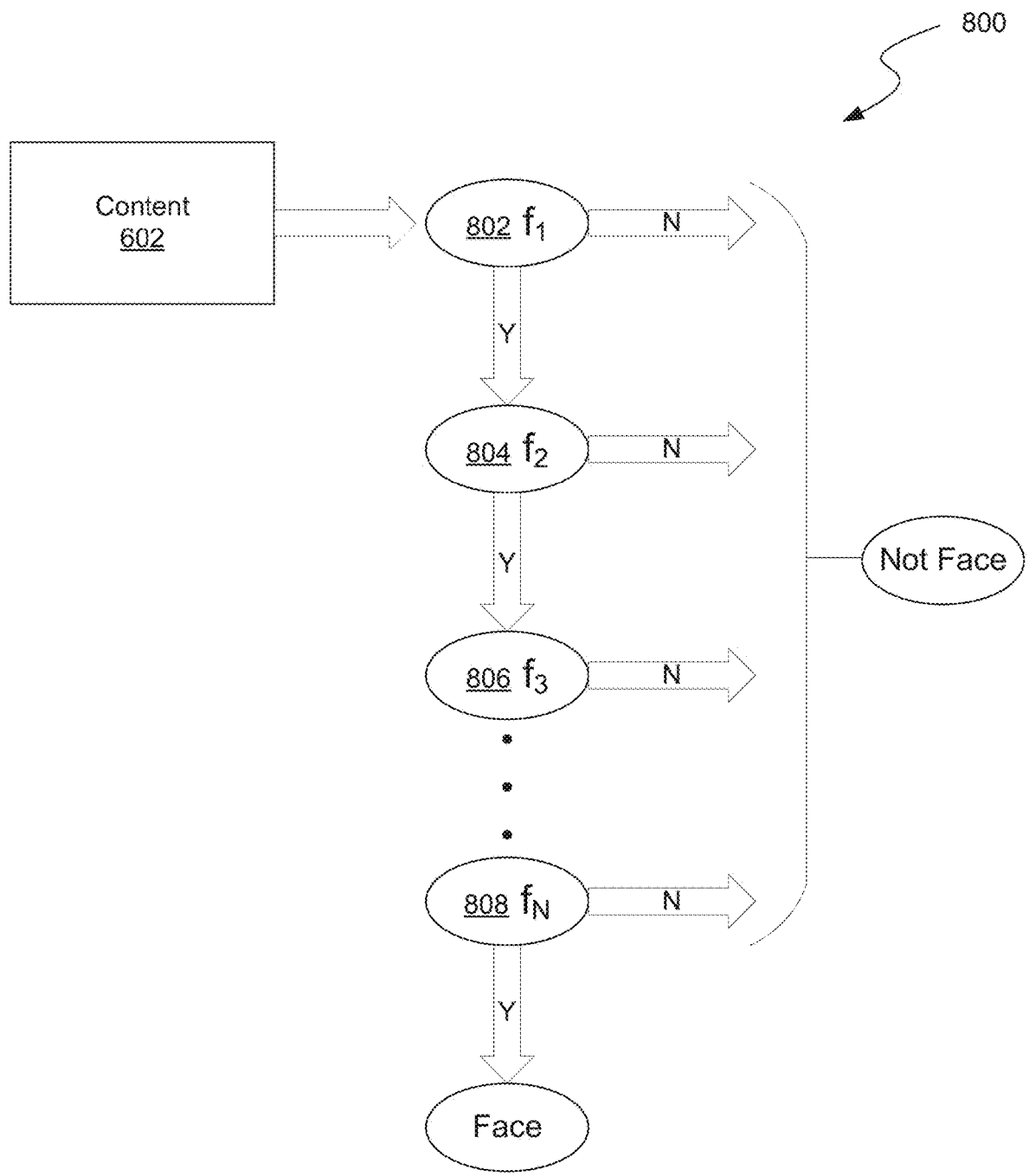
FIG. 8 is a flow diagram illustrating an example process for classifying objects detected in captured image or video content.

An example technique for classifying objects detected in images or video is the Haar Cascade classifier. FIG. 8 shows a flow diagram that illustrates an example high-level process 800 applied by a Haar Cascade classifier, specifically for classifying an object in a piece of content 602 as a face. As shown in FIG. 8, the content 602 (or a portion thereof) is fed into a first level process 802 which determines whether an object that can be classified as a face is present in the content 602. If, based on the processing at the first stage 802, it is determined that content 602 does not include an object that can be classified as a face, that object is immediately eliminated as an instance of a face. If, based on the processing at the first stage 802, it is determined that content 602 does include an object that can be classified as a face, the process 800 proceeds to the next stage 804 for further processing. Similar processes are applied at each stage 804, 806 and so on to some final stage 808.

Notably, each stage in the example process 800 may apply increasing levels of processing which requiring increasingly more computational resources. A benefit of this cascade technique is that objects that are not faces are immediately eliminated as such at higher stages with relatively little processing. To be classified as a particular type of object (e.g., face detection), the content must pass each of the stages 802-808 of the classifier.

Note that the example Haar Cascade classifier process 800 depicted in FIG. 8 is for classifying detected objects as faces; however, similar classifiers may be trained to detect other classes of objects (e.g., car, building, cat, tree, etc.).

Returning to FIG. 6, the content recognition process 610 may also include distinguishing between instances of detected objects. This is sometimes referred to as instance segmentation. For example, a grouping method may be applied to associate pixels corresponding to a particular class of objects to a particular instance of that class by selecting pixels that are substantially similar to certain other pixels corresponding to that instance, pixels that are spatially clustered, pixel clusters that fit an appearance-based model for the object class, etc. Again, this process may involve applying a deep learning (e.g., through applying a convolutional neural network) to distinguish individual instances of detected objects. Some example techniques that can be applied for identifying multiple objects include Regions with Convolutional Neural Network Features (RCNN), Fast RCNN, Single Shot Detector (SDD), You Only Look Once (Yolo), etc.

The content recognition process 610 may also include recognizing the identity of detected objects (e.g., specific people). For example, the analytics system 604 may receive inputs (e.g., captured images/video) to learn the appearances of instances of certain objects (e.g., specific people) by building machine-learning appearance-based models. Instance segmentations identified based on processing of content 602 can then be compared against such appearance-based models to resolve unique identities for one or more of the detected objects. Identity recognition can be particularly useful in this context as it may allow the system to adjust parameters to improve image quality, for example when unknown individuals are captured, while adjusting parameters to allow for lower image quality, for example when known individuals such as family members are captured, thereby conserving computing resources (e.g., storage space, network capacity) for content that contains critical information.

The content recognition process 610 may also include fusing information related to detected objects to gain a semantic understanding of the captured scene. For example, the content recognition process 606 may include fusing semantic information associated with a detected object with geometry and/or motion information of the detected object to infer certain information regarding the scene. Information that may be fused may include, for example, an object's category (i.e., class), identity, location, shape, size, scale, pixel segmentation, orientation, inter-class appearance, activity, and pose. As an illustrative example, the content recognition 606 process may fuse information pertaining to one or more detected objects to determine that a clip of video is capturing a known person (e.g., a neighbor) walking their dog past a house. The same process may be applied to another clip to determine that the other clip is capturing an unknown individual peering into a window of a surveilled house. The analytics system 604 can then use such information to generate parameter adjustments accordingly.

In some embodiments, labeled image data (e.g., historical video from one or more sources) may be input to train a neural network (or other machine-learning based models) as part of the content recognition process 610. For example, security experts may input previously captured video from a number of different sources as examples of good quality video and bad quality video and/or examples of certain classes of objects (e.g., car, building, cat, tree, etc.) to inform the content recognition process 610.

Based on the processing of content 602 according to the parameter optimization process 606, the analytics system 604 determines one or more parameter settings for one or more of the electronic devices 110 (e.g., camera 110*a*). The analytics system 604 then transmits parameter adjustments 612 that are based on the determined parameter settings to the one or more electronic devices 110 (e.g., camera 110a) to improve operation of the networked security system.

The parameter optimization process 606 may be configured to determine one or more parameter settings that will most result in content that most closely matches some set of one or more criteria. Criteria used to determine optimal parameter settings may include, for example, user device compatibility criteria, video-quality-based criteria (e.g., minimum quality, range of acceptable quality, etc.), latency-based criteria (e.g., maximum delay, range of acceptable delay, etc.), resource usage criteria (e.g., maximum file size, maximum CPU usage, maximum memory usage, etc.), cost-based criteria (e.g., royalty-free, maximum royalty costs, maximum cloud costs, etc.), user subscription criteria (e.g., required user permission level), or any other type of criteria upon which an assessment of content 602 may be based.

In some embodiments, criteria applied by the parameter optimization process may be based on the types of objects detected in the content. For example, as alluded to above, certain objects (e.g., unknown people) may be of greater interest in a security context and may therefor warrant higher quality video than other types of objects (e.g., stationary objects such as trees or buildings, or known people or pets). As an illustrative use case, parameter optimization process 606 may be configured to lower a quantization parameter (thereby retaining more image data) when certain objects such as a human face, a pet, or a car license plate are detected. Conversely, the parameter optimization process 606 may be configured to increase the quantization parameter (thereby discarding more image data) when other types of objects such as clouds, trees, or birds, are detected.

In some embodiments, criteria used to perform the parameter optimization process 606 can be specified at system installation and remain static or can be dynamically adjusted over time, for example, based on user input preferences, system-provider updates, and/or based on machine learning. For example, analytics system 604 may identify, by applying a deep learning-based content recognition process 610, that applying certain criteria to set parameter values leads to better results in perceived quality of content, overall system performance, implementation costs, or any other performance metric.

In some embodiments, multiple selection criteria may be weighted differently when applied during the parameter optimization process 606. For example, certain selection criteria deemed more important (e.g., video quality) may be weighted more heavily than other selection criteria (e.g., resource usage).

In some embodiments, parameter adjustments 612 may comprise updated values for one or more parameter settings that can be read by either base station 105 or the one or more electronic devices 110 and then utilized to reconfigure the one or more electronic devices. As an illustrative example, the analytics system 604 may determine, based on the processing of content 602, that the overall effectiveness of video surveillance would improve (e.g., through improving video quality) by changing the target bitrate applied by an encoder at a camera 110a from a current first value to a second value that is different than the first value. To cause this change, the analytics system 604 may transmit a message (e.g., over a computer network) that includes the updated second value for the target bitrate parameter to the base station 105 or directly to the camera 110a. If transmitted to the base station 105, the base station 105 may receive the message, interpret the message to determine the updated second value for the target bitrate parameter and utilize that updated second value to reconfigure one or more video encoders (at cameras 110a or at the base station 105) that are utilized to encode video captured by one or more of the cameras.

In some embodiments, parameter adjustments 612 may comprise a software module configured based on updated values for one or more parameter settings. As an illustrative example, the analytics system 604 may determine, based on the processing of content 602, that the overall effectiveness of video surveillance would improve (e.g., through improving video quality) by utilizing a different codec to encode captured video. To cause this change, the analytics system 604 may transmit a software module including an updated codec to the base station 105 or directly to the camera 110a. The software module containing the updated codec may be a pre-existing software module or may be compiled or otherwise generated (by the analytics system 604 or another computer processing system) in response to performing the parameter optimization process 606.

Parameter adjustments 612 may be pushed by the analytics system 604 to the base station 105 or the one or more electronic devices 110 continually, as needed, at periodic intervals, and/or in response to detecting certain events or conditions. Alternatively, or in addition, the analytics system 604 may transmit parameter adjustments 612 in response to receiving requests from the base station 105 and/or the one or more electronic devices 110.

In some embodiments, parameter adjustments 612 may be sent by the analytics system 604 to all electronic devices 110, at least of a particular type (e.g., cameras 110a). For example, the analytics system may determine an updated value for a particular parameter (e.g., target bitrate) and may transmit a parameter adjustment 612 to update all cameras 110a associated with a particular security system or multiple security systems.

Alternatively, or in addition, parameter adjustments 612 may be provided on a more selective basis. For example, the analytics system 604 may identify those security cameras 110a in similar surveilled environments based, for example, on environmental characteristics such as ambient light level, event frequency, the presence of pets and/or children, geographical location, etc. In such embodiments, the analytics system 604 may only transmit certain parameter adjustments 612 to those base stations 105 corresponding to security cameras 110a in similar surveilled environments. Such action ensures that security cameras 110a in dissimilar surveilled environments (e.g., brightly lit backyards and dimly lit alleys) do not receive the same parameter adjustments.

In some embodiments, analytics system 604 may utilize user feedback 614 provided by one or more users when performing the parameter optimization process 606. For example, feedback 614 from one or more end users may indicate content that users consider desirable, helpful, or otherwise of high quality. The analytics system 604 may utilize such feedback, for example, to a deep learning-based content recognition process or to set or weight parameter selection criteria as part of the parameter optimization process 606.

In some embodiments, user feedback 614 is collected from all users of associated security systems and aggregated by the analytics system 604 before being utilized to inform the parameter optimization process 606. Alternatively, or in addition, user feedback 614 can be collected and aggregated based on cohorts of users that share some characteristic in common such as geographic location, security system type and configuration, demographic information, etc. For example, when performing the parameter optimization process 606, the analytics system 604 may consider user feedback 614 from a particular cohort of users such as users within a particular neighborhood. The analytics system 604 may then transmit parameter adjustments 612 generated based on the user feedback from the cohort of users specifically to base stations 105 associated with security systems of the cohort of users.

Figure 9:
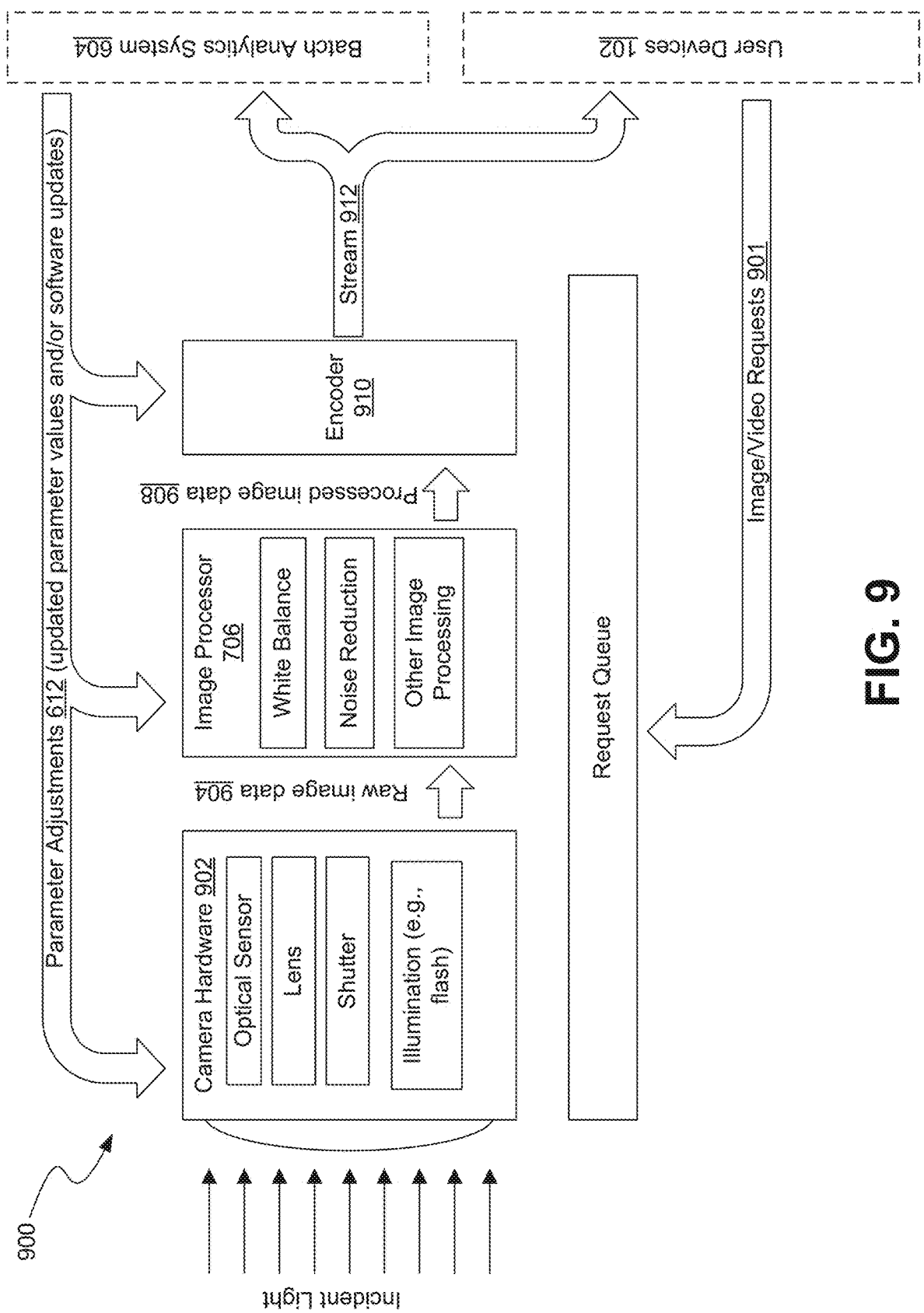
FIG. 9 is an architecture flow diagram illustrating how parameters can be adjusted in a network-connected security system.

FIG. 9 shows a diagram of an example architecture 900 of an electronic device 110 in the form of a camera 110a that illustrates how parameter adjustments may be input to the electronic device. As shown in FIG. 9, a video camera 110a may comprise camera hardware 902 such as one or more optical sensors, lenses, mechanical shutters, and illuminating devices (e.g., an LED flash).

To receive a video stream from a video camera 110a of the networked security system, a request 901 may be received, for example, based on a user input received via an interface 510 presented at the user device 102 by a security management platform 508.

The received request causes the camera hardware 902 to capture images of the surveilled environment based on incident light. The output from the camera hardware 902 may comprise raw image data. This raw image data may be output to an image processor 904, for example, to perform various processes such as auto white balance, noise reduction, and other digital image processing. The processed image data 908 is then output to an encoder which converts the processed image data into an encoded stream which can then be transmitted over a computer network to the base station 105 and eventually on to a user device 102 originating the request as well as the analytics system 604 for parameter optimization. Note that the image processor 906 and encoder 910 are depicted in FIG. 9 as separate components from the camera hardware 920; however, in some embodiments, image processor 906 and/or encoder 910 may comprise, at least in part, hardware such as a physical processing unit and a physical memory device storing instructions for performing image processing and encoding functions.

The content 602 submitted to the analytics system 604 will typically include the encoded stream 912 that is transmitted over a computer network, for example, via base station 105. However, in some embodiments, the content 602 may include, alternatively or in addition, the raw image data 904 and/or processed image data 908. For example, depending on the architecture of the security system, an analytics system 604 may be configured to receive and analyze raw image data 904 and processed image data 908, for example, to determine how certain combinations of optical parameters, image processing parameters, and/or encoder parameters impact the quality of output. Based on this analysis, the analytics system 604 may determine an optimal combination of optical, image processing, and/or encoder parameters to apply to maximize video quality.

As previously discussed with respect to FIG. 6, the analytics system 604 may return one or more parameter adjustments 612, for example, in the form of updated parameter values and/or updated software modules. Further, as shown in FIG. 9, these parameter adjustments 612 may update any one or more of optical parameters, image processing parameters, and/or encoder parameters associated with an electronic device 110, specifically a camera 110a.

In some embodiments, a given set of parameter adjustments 612 based on an analysis of content 612 may include updates to various subcomponents of the electronic device 110a and may include different types of adjustments. For example, based a parameter optimization process 606, the analytics system 604 may determine an optimal set of parameters that include an updated optical parameter (e.g., an updated ISO setting for the optical sensor), an updated image processing parameter (e.g., an updated illuminant color for auto white balance), and an updated encoder parameter (e.g., an updated encoder profile). In the illustrative example, the analytics system 604 may transmit the parameter adjustments 612 as a combination of messages including updated parameter values (e.g., a message including an updated illuminant color) and software modules (e.g., a software module including an updated codec).

Figure 10:
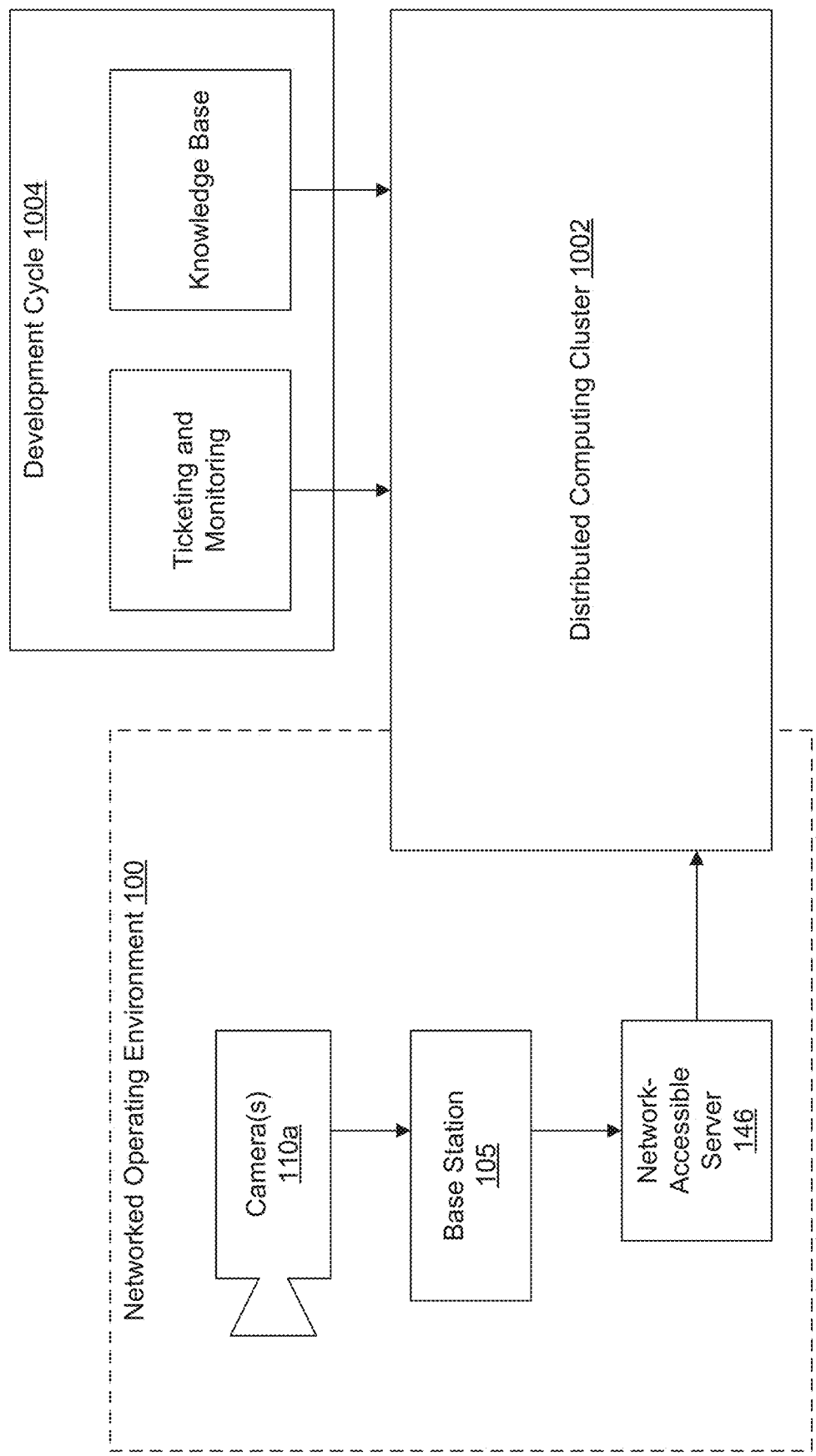
FIG. 10 is a diagram illustrating how a distributed computing cluster can be utilized to process content.

Various programming models and associated techniques for processing/generating big data sets can be applied by the analytics system 604 to process content 602 and generate parameter adjustments 612. For example, in some embodiments, analytics system 604 may utilize a distributed computing cluster to process content 602. Utilizing a distributed computing architecture can be particularly beneficial when processing large amounts of data such as content received from a security system or multiple security systems. FIG. 10 illustrates how various inputs such as content 602 (e.g., video clips, keystrokes) and session metadata may be received from base station(s) 105, for example, via a network-accessible server 146 and fed into a distributed computing cluster 1002. In some embodiments, input data from a development cycle 1004 such as ticketing/monitoring information and/or information stored in a knowledge base may also be input to the distributed computing cluster 1002.

The distributed computing cluster 1002 may represent a logical entity that includes sets of host machines (not shown in FIG. 8) that run instances of services configured for distributed processing of data. In an example embodiment, the distributed computing cluster 1002 may comprise an Apache Hadoop™ deployment. Apache Hadoop™ is an open-source software framework for reliable, scalable and distributed processing of large data sets across clusters of commodity machines. Examples of services/utilities that can be deployed in an Apache Hadoop™ cluster include the Apache Hadoop™ Distributed File System (HDFS), MapReduce™, Apache Hadoop™ YARN, and/or the like. The host computing devices comprising the computing cluster 1002 can include physical and/or virtual machines that run instances of roles for the various services/utilities. For example, the Apache™ HDFS service can have the following example roles: a NameNode, a secondary NameNode, DataNode, and balancer. In a distributed system such as computing cluster 1002, one service may run on multiple host machines.

Figure 11:
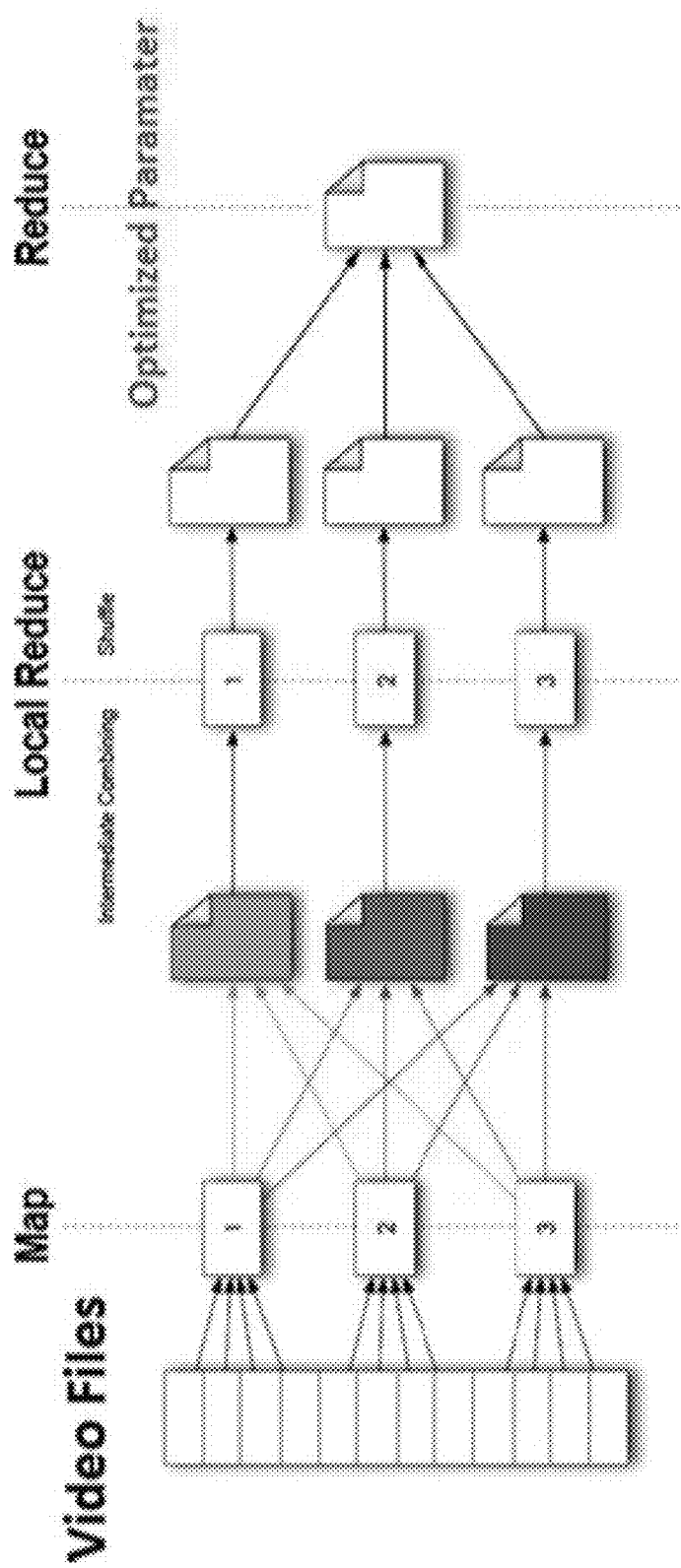
FIG. 11 is a diagram illustrating how MapReduce™ can be utilized in combination with Apache Hadoop™ in the distributed computing cluster depicted in FIG. 10.

FIG. 11 illustrates how MapReduce™ can be utilized in combination with Apache Hadoop™ in a distributed computing cluster 1002 to process various sources of information. MapReduce™ is a programming model for processing/generating big data sets with a parallel, distributed algorithm on a cluster. As shown in FIG. 11, MapReduce™ usually splits an input data set (e.g., content 602 comprising video clips) into independent chunks that are processed by the map tasks in a parallel manner. The framework sorts the outputs of the map tasks, which are then input to the reduce tasks. Ultimately, the output of the reduce tasks are one or more optimized parameter values that can be distributed as a parameter adjustment 612 by the analytics system 604 to one or more electronic devices 110, for example, via base station 105.

Figure 12:
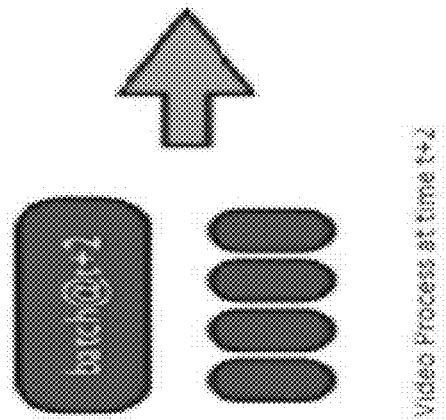
FIG. 12 is a diagram illustrating how content can be processed in batches.
Figure 12:
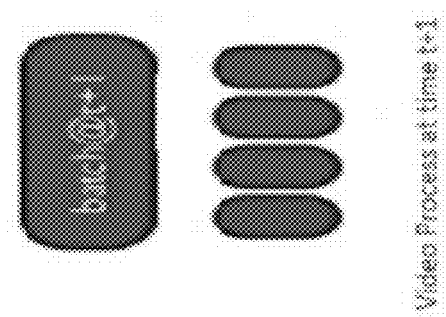
Figure 12:
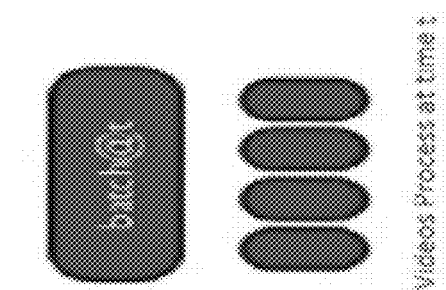

FIG. 12 illustrates how content 602 can be processed in batches by the analytics system 604. Here, for example, video clips generated by security cameras may be processed in groups. In some embodiments, all of the video clips corresponding to a certain segment of surveilled environments (e.g., a particular group of homes) are collected on a periodic basis. For example, video clips may be collected every 15 minutes, 30 minutes, 60 minutes, 120 minutes, etc. Thereafter, each batch of video clips can be processed. After processing has been completed, the parameter adjustments 612 can be generated by the analytics system 604 and distributed to various network-connected security systems to configure or reconfigured certain electronic devices. Thus, the electronic devices associated with a given network-connected security system may be periodically configured instead of continually configured and reconfigured. Users may be permitted to manually specify the cadence at which electronic devices are configured based on parameter adjustments from the analytics system 604.

Figure 13:
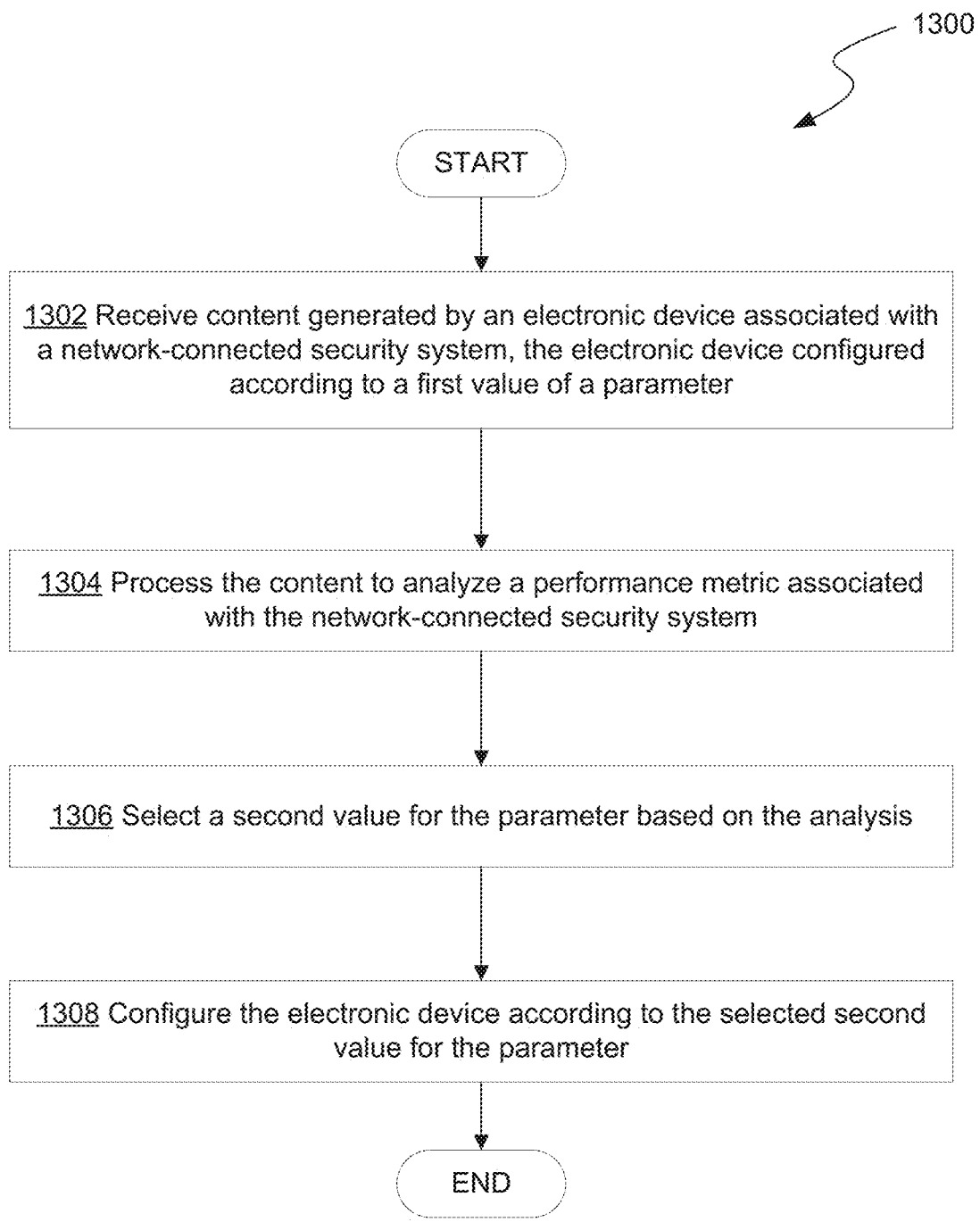
FIG. 13 is a flow diagram of an example process for presenting notifications at a client device based on analysis of content generated at electronic devices in a network-connected security system.

FIG. 13 shows a flow chart of an example process 1300 for adjusting electronic device parameters based on analysis of content, according to some embodiments. One or more steps of the example process 1300 may be performed by any one or more of the components of the example computer system 1400 described with respect to FIG. 14. For example, the example process 1300 depicted in FIG. 13 may be represented in instructions stored in memory that are then executed by a processing unit. The process 1300 described with respect to FIG. 13 is an example provided for illustrative purposes and is not to be construed as limiting. Other processes may include more or fewer steps than depicted while remaining within the scope of the present disclosure. Further, the steps depicted in example process 1300 may be performed in a different order than is shown.

Example process 1300 begins at step 1302 with receiving content 602 generated by an electronic device 110 configured according to a first value of a parameter. As previously discussed, the electronic device 110 may be one of several electronic devices 110 associated with a network-connected security system. In some embodiments, the content 602 is received at step 1302 via a computer network, from a base station 105 associated with the network-connected security system.

In some embodiments, the network-connected security system is a video surveillance system and the electronic device 110 is a network-connected video camera 110a. In such embodiments the content 602 may include video files. Further, the optical parameter may be any of an optical parameter, an image processing parameter, or an encoding parameter.

Example process 1300 continues at step 1304 with processing the content to analyze a performance metric associated with the network-connected security system and step 1306 with selecting a second value for the parameter associated with the electronic device 110 based on the analysis. The performance metric in this case may include a perceived quality of the content 602 generated by the network-connected security system, but may also include other types of performance metrics based, for example, on computing resource utilization, latency, security threat detection, etc.

In some embodiments, the step of processing the content to analyze the performance metric associated with the network-connected security system (step 1304) may include applying a content recognition process 610. The content recognition process 610 may include applying machine-learning, specifically deep learning using a neural network.

In some embodiments, the step of selecting a second value for the parameter (step 1306) may include applying a parameter optimization process 606 to select a second value that will increase the overall performance of the network-connected security system. Specifically, this step may include selecting a second value that will maximize the performance metric analyzed at step 1304 while taking into account one or more operational constraints associated with the network-connected security system such as content generation constraints, processing constraints, network bandwidth constraints, etc.

Depending on the computer system performing example process 1300, steps 1304 and 1306 may include transmitting the content 602 to another computing system for processing. For example, if a base station 105 is performing process 1300, steps 1304 and 306 may include transmitting, by the base station 105, the content 602, via an external network, to an external computing system such as a network-accessible server system 145 to process the content 602 to analyze the performance metric associated with the network-connected security system and to select the second value for the parameter based on the analysis.

Example process 1300 concludes at step 1308 with configuring (or causing another system to configure) the electronic device 110 according to the second value for the parameter selected at step 1306.

In some embodiments, configuring the electronic device 110 according to the second parameter may include generating a software module based on the selected second parameter and transmitting the software module (e.g., over a computer network) to a system to be utilized to configure the electronic device 110. For example, a computer system that selects the second value for the parameter and/or that generates the software module (e.g., network-accessible server system 145) may transmit the software module over an external network to a base station 105 associated with the network-connected security system. The base station 105 may then utilize the received software module to configure the electronic device 110 according to the selected second value, for example, by transmitting the software module over a local network to the electronic device 110 for installation at the electronic device 110.

In some embodiments, configuring the electronic device 110 according to the second parameter may include transmitting a message including the second value of the parameter to a system to be utilized to configure the electronic device 110. For example, a computer system that selects the second value for the parameter (e.g., network-accessible server system 145) may transmit a message including the selected second value for the parameter over an external network to a base station 105 associated with the network-connected security system. The base station 105 may then read the received message and configure the electronic device according to the second value for the parameter included in the received message.

The base station 105 may utilize the received message to configure the electronic device 110 in several different ways. In some embodiments, the base station 105 may simply forward the received message over a local network to the electronic device 110. In other embodiments, the base station 105 may generate a new message that is readable by the electronic device 110 and that includes the selected second value for the parameter. In both cases, the electronic device 110 may utilize messages received from the base station 105 to configure itself according to the selected second value of the parameter. In other some embodiments, the base station 105 may generate a software module (e.g., as described above) based on the received message and transmit the software module over a local network to the electronic device 110 for installation at the electronic device 110.

Although not indicated in FIG. 13, in some embodiments the example process 1100 may be continually repeated (e.g., at periodic intervals or in response to detected events). In such cases, example process 1300 may further include continuing to receive additional content generated by the electronic device 110, continually selecting updated values for the parameter based on the additional content as the additional content is received and processed, and periodically configuring the electronic device 110 according to the updated values as the updated values are selected.

Computer System

Figure 14:
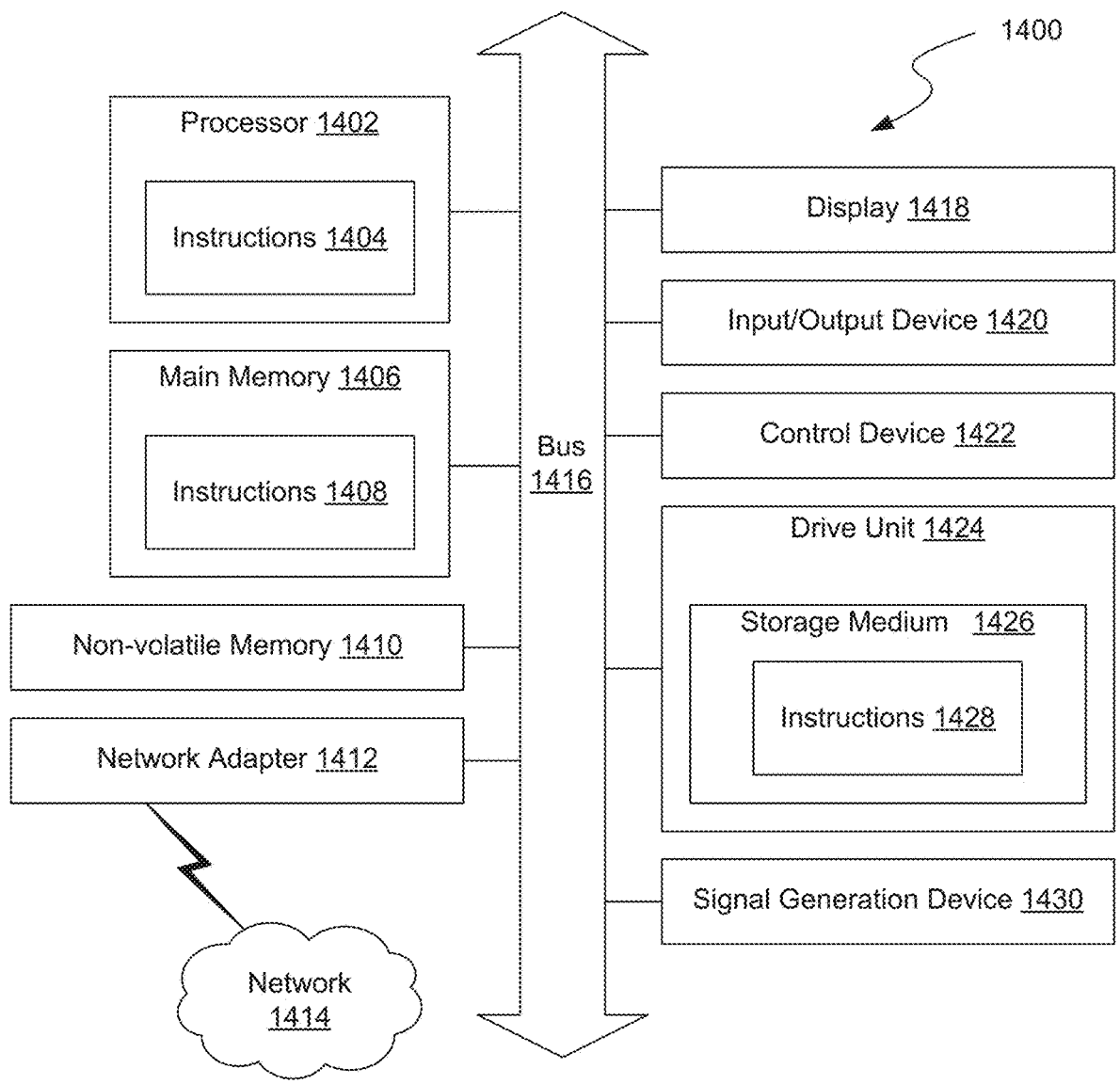
FIG. 14 is a diagram illustrating an example of a computer processing system in which at least some operations described herein can be implemented.

FIG. 14 is a block diagram illustrating an example of a computer system 1400 in which at least some operations described herein can be implemented. For example, some components of the computer system 1400 may be hosted any one or more of the devices described with respect to operating environment 100 in FIG. 1 such as electronic devices 110, base station 105, APs 120, local storage 115, network-accessible server system 145, and user devices 102.

The computer system 1400 may include one or more central processing units ("processors") 1402, main memory 1406, non-volatile memory 1410, network adapter 1412 (e.g., network interface), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1400 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the computer system 1400.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the one or more processors 1402, the instruction(s) cause the computer system 1400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1410, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1412 enables the computer system 1400 to mediate data in a network 1414 with an entity that is external to the computer system 1400 through any communication protocol supported by the computer system 1400 and the external entity. The network adapter 1412 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1412 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
   receiving, by a computer system, content generated by an electronic device of a security system;
   detecting, by the computer system, one or more physical objects captured in the content using computer-vision techniques;
   processing, by the computer system, the content using machine learning, the processing comprising classifying the one or more physical objects based on one or more criteria;
   determining, by the computer system, a parameter for the electronic device based on the processing, such that a performance metric of the security system is increased when the electronic device is configured using the parameter;
   configuring, by the computer system, the electronic device using the parameter; and
   exchanging signaling information with a user device to determine a path between the computer system and the user device based on locations of the computer system and the user device for sending the content to the user device via the path using a peer-to-peer (P2P) connection.

2. The method of claim 1, wherein the parameter is any one of an optical parameter, an image processing parameter, or an encoding parameter.

3. The method of claim 1, wherein the content comprises video files.

4. The method of claim 1, wherein classifying the one or more physical objects comprises identifying, by the computer system, instances of different classes of the one or more physical objects.

5. The method of claim 1, wherein classifying the one or more physical objects comprises deep learning-based video recognition using a plurality of representational layers.

6. The method of claim 1, wherein classifying the one or more physical objects comprises distinguishing between instances of the one or more physical objects using at least one of Regions with Convolutional Neural Network Features (RCNN), Fast RCNN, Single Shot Detector (SSD), or You Only Look Once (YOLO).

7. The method of claim 1, further comprising determining an identity of the detected physical objects using machine-learning appearance-based models.

8. The method of claim 1, wherein processing the content comprises training a machine-learning model using labeled image data.

9. The method of claim 1, further comprising:
   accessing, by the computer system, historical user feedback data based on previous content generated by the electronic device, wherein:
   the performance metric of the security system is based at least on the historical user feedback data.

10. A computer configured to:
    receive content generated by an electronic device of a security system;
    detect one or more physical objects captured in the content using computer-vision techniques;
    process the content using machine learning, the processing comprising classifying the one or more physical objects based on one or more criteria;
    determine a parameter for the electronic device based on the processing, such that a performance metric of the security system is increased when the electronic device is configured using the parameter;
    configure the electronic device using the parameter; and
    exchange signaling information with a user device to determine a path between the computer system and the user device based on locations of the computer system and the user device for sending the content to the user device via the path using a peer-to-peer (P2P) connection.

11. The computer of claim 10, wherein the electronic device is a network-connected video camera.

12. The computer of claim 10, wherein the parameter is any one of an optical parameter, an image processing parameter, or an encoding parameter.

13. The computer of claim 10, wherein the content comprises video files.

14. The computer of claim 10, configured to classify the one or more physical objects by identifying instances of different classes of the one or more physical objects.

15. The computer of claim 10, configured to classify the one or more physical objects by deep learning-based video recognition using a plurality of representational layers.

16. The computer of claim 10, configured to classify the one or more physical objects by distinguishing between instances of the detected physical objects using at least one of Regions with Convolutional Neural Network Features (RCNN), Fast RCNN, Single Shot Detector (SSD), or You Only Look Once (YOLO).

17. The computer of claim 10, configured to classify the one or more physical objects by determining an identity of the detected physical objects using machine-learning appearance-based models.

18. The computer of claim 10, further configured to process the content by training a machine-learning model using labeled image data.

19. A computer-readable non-transitory storage medium storing computer instructions, which when executed by one or more computer processors cause the one or more computer processors to:
    receive content generated by an electronic device of a security system;
    detect one or more physical objects captured in the content using computer-vision techniques;

process the content using machine learning, the processing comprising classifying the one or more physical objects based on one or more criteria;

determine a parameter for the electronic device based on the processing, such that a performance metric of the security system is increased when the electronic device is configured using the parameter;

configure the electronic device using the parameter; and exchange signaling information with a user device to determine a path between the computer system and the user device based on locations of the computer system and the user device for sending the content to the user device via the path using a peer-to-peer (P2P) connection.

* * * * *